US010642705B2

(12) United States Patent
Furuya

(10) Patent No.: US 10,642,705 B2
(45) Date of Patent: May 5, 2020

(54) STORAGE SYSTEM AND STORAGE METHOD

(71) Applicant: FUJITSU LIMITED, Kawasaki-shi, Kanagawa (JP)

(72) Inventor: Masanori Furuya, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/241,289

(22) Filed: Jan. 7, 2019

(65) Prior Publication Data

US 2019/0220375 A1 Jul. 18, 2019

(30) Foreign Application Priority Data

Jan. 15, 2018 (JP) ................................ 2018-004062

(51) Int. Cl.
| G06F 11/20 | (2006.01) |
| G06F 11/16 | (2006.01) |
| G06F 11/07 | (2006.01) |
| G06F 3/06 | (2006.01) |
| G06F 13/10 | (2006.01) |

(52) U.S. Cl.
CPC ........ *G06F 11/2094* (2013.01); *G06F 3/0619* (2013.01); *G06F 11/0727* (2013.01); *G06F 11/0757* (2013.01); *G06F 11/0793* (2013.01); *G06F 11/1658* (2013.01); *G06F 11/201* (2013.01); *G06F 13/10* (2013.01)

(58) Field of Classification Search
None
See application file for complete search history.

(56) References Cited

U.S. PATENT DOCUMENTS

| 6,185,601 B1* | 2/2001 | Wolff ...................... G06F 16/10 709/203 |
| 6,826,613 B1* | 11/2004 | Wang .................... G06F 3/0607 709/202 |
| 7,441,046 B2* | 10/2008 | Kaehn ..................... H04L 67/14 709/229 |
| 9,800,592 B2* | 10/2017 | Jain ..................... H04L 63/1416 |
| 2002/0016827 A1* | 2/2002 | McCabe ............. G06F 11/2058 709/213 |
| 2002/0116485 A1* | 8/2002 | Black ...................... H04L 29/06 709/223 |
| 2007/0055797 A1 | 3/2007 | Shimozono |

(Continued)

FOREIGN PATENT DOCUMENTS

| JP | 2007-072571 | 3/2007 |
| WO | 2016/013116 | 1/2016 |

*Primary Examiner* — Michael Sun
(74) *Attorney, Agent, or Firm* — Fujitsu Patent Center

(57) ABSTRACT

A storage system includes a first memory, and a processor configured to calculate a first number of accesses from a first server to the first memory and a second number of accesses from a second server to the first memory, detect switching from the first server to the second server in accordance with the first number and the second number, determine whether a first site in which the first memory is disposed and a second site in which the second server is disposed are different on the basis of location information that represents a location relationship between the first memory and the second server, and perform a change of an access destination of the second server to a second memory disposed in the second site when the first site and the second site are different.

11 Claims, 21 Drawing Sheets

(56) References Cited

U.S. PATENT DOCUMENTS

| | | | |
|---|---|---|---|
| 2009/0125669 A1* | 5/2009 | Gupta | G06F 11/1435 711/103 |
| 2011/0022812 A1* | 1/2011 | van der Linden | G06F 9/5077 711/163 |
| 2015/0277821 A1* | 10/2015 | Mori | G06F 3/1288 358/1.15 |
| 2016/0191509 A1* | 6/2016 | Bestler | G06F 16/2255 713/163 |
| 2017/0083417 A1* | 3/2017 | Kawaguchi | G06F 3/0619 |
| 2017/0302655 A1* | 10/2017 | Sondhi | H04L 63/0807 |

* cited by examiner

FIG. 14

| FO GROUP | FREQUENCY OF I/O FROM SITE Sa | FREQUENCY OF I/O FROM SITE Sb |
|---|---|---|
| g1 | 1000 | 1 |
| g2 | 1 | 100 |
| ... | ... | ... |

STORAGE SYSTEM AND STORAGE METHOD

CROSS-REFERENCE TO RELATED APPLICATION

This application is based upon and claims the benefit of priority of the prior Japanese Patent Application No. 2018-4062, filed on Jan. 15, 2018, the entire contents of which are incorporated herein by reference.

FIELD

The embodiments discussed herein are related to a storage technique.

BACKGROUND

A storage system includes a storage apparatus including memory apparatus such as hard disk drive (HDD) and solid state drive (SSD) and a controller module that controls a storing apparatus and a server that issues input/output (I/O) to the storing apparatus, and records and manages a large amount of data treated in information processing.

Furthermore, in the storage system, a redundant configuration is made in order to ensure the reliability. For example, clustering is carried out between servers and between pieces of storage apparatus. Moreover, a multipath is formed as the path between the server and the storage apparatus. For such a storage system, a technique in which, at the time of the occurrence of failure, switching to the redundant configuration is carried out to avoid the failure and operation is continued has been developed.

For example, related techniques are disclosed in International Publication Pamphlet No. WO 2016/013116 and Japanese Laid-open Patent Publication No. 2007-72571.

SUMMARY

According to an aspect of the embodiment, a storage system includes a first memory, and a processor configured to calculate a first number of accesses from a first server to the first memory and a second number of accesses from a second server to the first memory, detect switching from the first server to the second server in accordance with the first number and the second number, determine whether a first site in which the first memory is disposed and a second site in which the second server is disposed are different on the basis of location information that represents a location relationship between the first memory and the second server, and perform a change of an access destination of the second server to a second memory disposed in the second site when the first site and the second site are different.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 is a diagram illustrating one example of an I/O frequency table;

DESCRIPTION OF EMBODIMENTS

A server preferentially accesses the path with the lowest communication overhead (optimum path) among plural paths by using a protocol called Asymmetric logical unit access (ALUA). The ALUA is a protocol for identifying the optimum path between the server and storage apparatus. In the ALUA, notification of the present path state is carried out from the storage apparatus to the server and the server selects the optimum path from plural paths based on the path state and access the optimum path.

On the other hand, if failure or the like occurs in a server in the clustered servers, failover by which the operation state is switched from the server in which the failure has occurred to a normal server is carried out. When such failover of the server is carried out, with a system configuration of a related technique, it is difficult for the storage apparatus side to detect the failover of the server in some cases. In such a state, the path state after the failover of the server is not notified to the server side by the storage apparatus. Thus, it is difficult for the server after the failover to select the optimum path and the lowering of the availability and the reliability occurs.

The present embodiments will be described below with reference to the drawings.

First Embodiment

Figure 1:
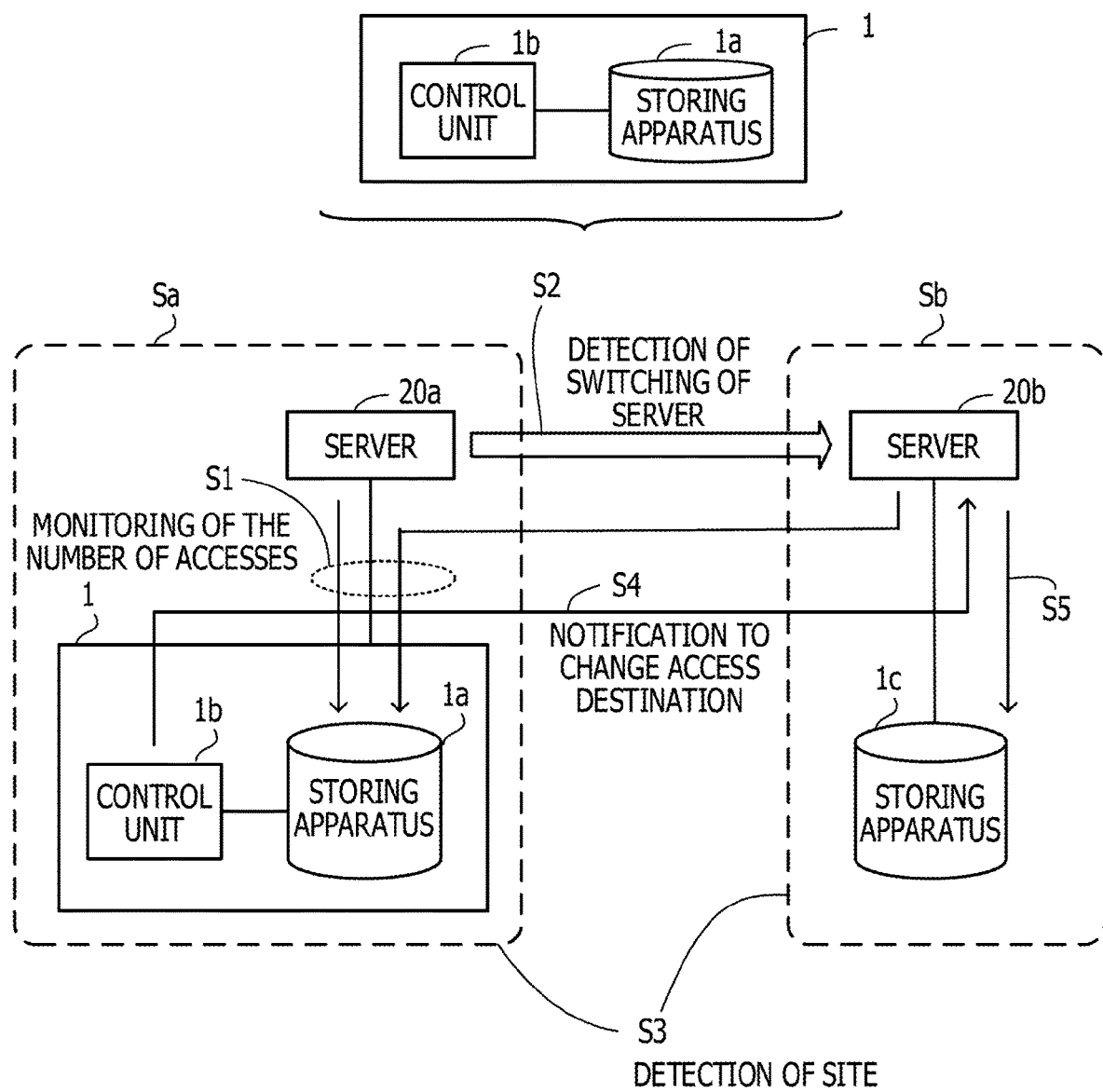
FIG. 1 is a diagram illustrating one example of a configuration of a storage apparatus.

A first embodiment will be described by using FIG. 1. FIG. 1 is a diagram illustrating one example of a configuration of a storage apparatus. A storage apparatus 1 includes a storing apparatus 1a (first storing apparatus) and a control unit 1b.

[Step S1] The control unit 1b monitors a first number of accesses from a server 20a (first server) to the storing apparatus 1a and a second number of accesses from a server 20b (second server) to the storing apparatus 1a.

[Step S2] If determining that the second number of accesses surpasses the first number of accesses, the control unit 1b detects that switching from the server 20a to the server 20b has occurred.

[Step S3] The control unit 1b detects a site Sa in which the storing apparatus 1a is disposed (first site) and a site Sb in which the server 20b is disposed (second site) based on location information that represents the location relationship between the storing apparatus 1a and the server 20b.

[Step S4] If the site Sa and the site Sb are different, the control unit 1b notifies the server 20b of information to change the access destination to a storing apparatus 1c (second storing apparatus) disposed in the site Sb.

[Step S5] When receiving this information, the server 20b changes the access destination from the storing apparatus 1a to the storing apparatus 1c and carries out access to the storing apparatus 1c.

As above, a storage apparatus 1 detects switching from the server 20a to the server 20b based on the numbers of accesses of the servers 20a and 20b and changes the access path from the storing apparatus 1a to the storing apparatus 1c in conjunction with the server switching. Thereby, the storage apparatus 1 enables the server 20b to access the path with the lowest communication overhead even after the failover of the server 20a.

Figure 2:
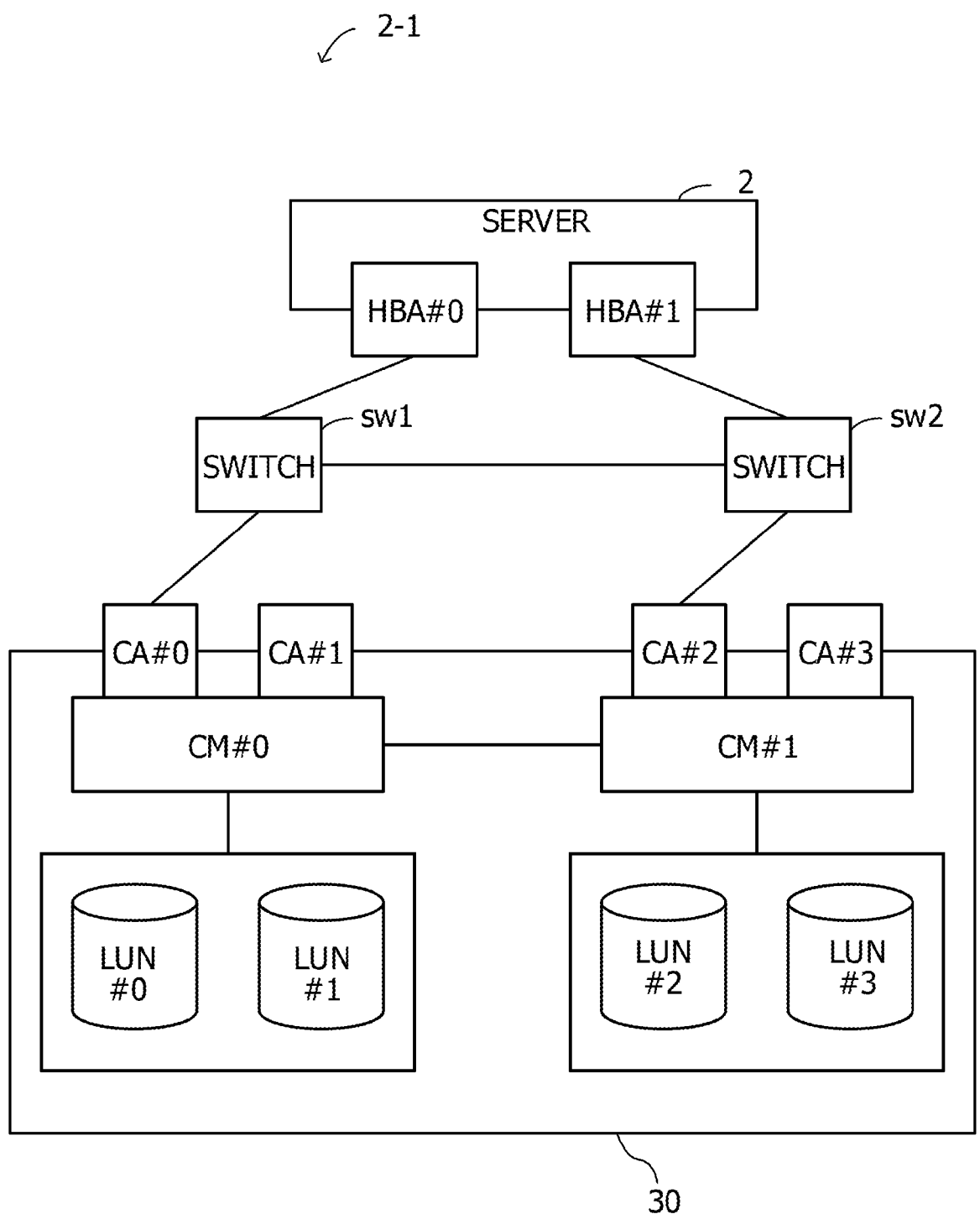
FIG. 2 is a diagram illustrating one example of a configuration of a storage system with a single storage.

Next, a storage system with a multipath configuration will be described. FIG. 2 is a diagram illustrating one example of the configuration of a storage system with a single storage. A storage system 2-1 is a system with a multipath configuration for the single storage and includes a server 2, switches sw1 and sw2, and a storage 30. The switches sw1 and sw2 are storage area network (SAN) switches, for example.

The server 2 is equipped with host bus adapters (HBA) #0 and #1. The storage 30 includes controller modules (CM) #0 and #1 and logical unit numbers (LUN) #0, . . . , #3. Furthermore, the storage 30 is equipped with channel adapters (CA) #0, . . . , #3. Hereinafter, the controller module will be represented as CM.

The HBA is an adapter that is mounted on the server side and implements an interface with the CA with the intermediary of the switch. The CA is an adapter that is mounted on the storage side and implements an interface with the HBA with the intermediary of the switch. The CM is a module that includes processor, cache memory, and so forth and controls operation in the storage.

The coupling relationship of the respective constituent elements is as follows. The switch sw1 is coupled to HBA #0 and CA #0 and the switch sw2 is coupled to HBA #1 and CA #2. Furthermore, the switches sw1 and sw2 are coupled to each other.

CAs #0 and #1 are mounted on CM #0 and CAs #2 and #3 are mounted on CM #1. CMs #0 and #1 are coupled to each other. Furthermore, LUNs #0 and #1 are put under the control of CM #0 and LUNs #2 and #3 are put under the control of CM #1.

Here, the small computer system interface (SCSI) is widely used for the data transfer system between the server and the storage. With the SCSI, plural access paths between the server and the storage can be set. Furthermore, for the server, switching to another server is carried out to continue access to the storage at the time of failure by a function of failover.

In the storage system 2-1, four paths can be set as the access paths to LUN #0. For example, the four paths are a path of HBA #0 to CA #0, a path of HBA #0 to CA #2, a path of HBA #1 to CA #0, and a path of HBA #1 to CA #2.

The path of HBA #0 to CA #0 is a path that goes through HBA #0, the switch sw1, CA #0, and CM #0 and the path of HBA #0 to CA #2 is a path that goes through HBA #0, the switch sw1, the switch sw2, CA #2, CM #1, and CM #0.

Furthermore, the path of HBA #1 to CA #0 is a path that goes through HBA #1, the switch sw2, the switch sw1, CA #0, and CM #0 and the path of HBA #1 to CA #2 is a path that goes through HBA #1, the switch sw2, CA #2, CM #1, and CM #0.

Meanwhile, the server 2 can preferentially access the optimum path among plural access paths by using the above-described ALUA. For example, in the storage system 2-1, LUN #0 is under the control of CM #0 and thus the access path that goes through CA #0 allows direct access from CM #0 to LUN #0.

In contrast, with the access path that goes through CA #2, the server 2 accesses LUN #0 after carrying out communication from CM #1 to CM #0 and communication overhead occurs.

Thus, CM #0 notifies the server 2 of the access state of the path that goes through CA #0 as the optimum path (Active/Optimized). Furthermore, CM #0 notifies the server 2 of the access state of the path that goes through CA #2 as the path with the possibility of the occurrence of performance deterioration (Active/Non-Optimized).

This notification is carried out as response to a command that is transmitted from the server 2 and is called report target port groups (Report TPGS). When acquiring the access state of each path by using the Report TPGS command, the server 2 that supports the ALUA preferentially issues I/O to the Active Optimized path.

Among the above-described four paths to LUN #0, the path of HBA #0 to CA #0 and the path of HBA #1 to CA #0 are direct paths to LUN #0 and therefore are the Active/Optimized paths.

Furthermore, the path of HBA #0 to CA #2 and the path of HBA #1 to CA #2 are bypass paths to LUN #0 with the intermediary of CM #1 and therefore are the Active/Non-Optimized paths.

Figure 3:
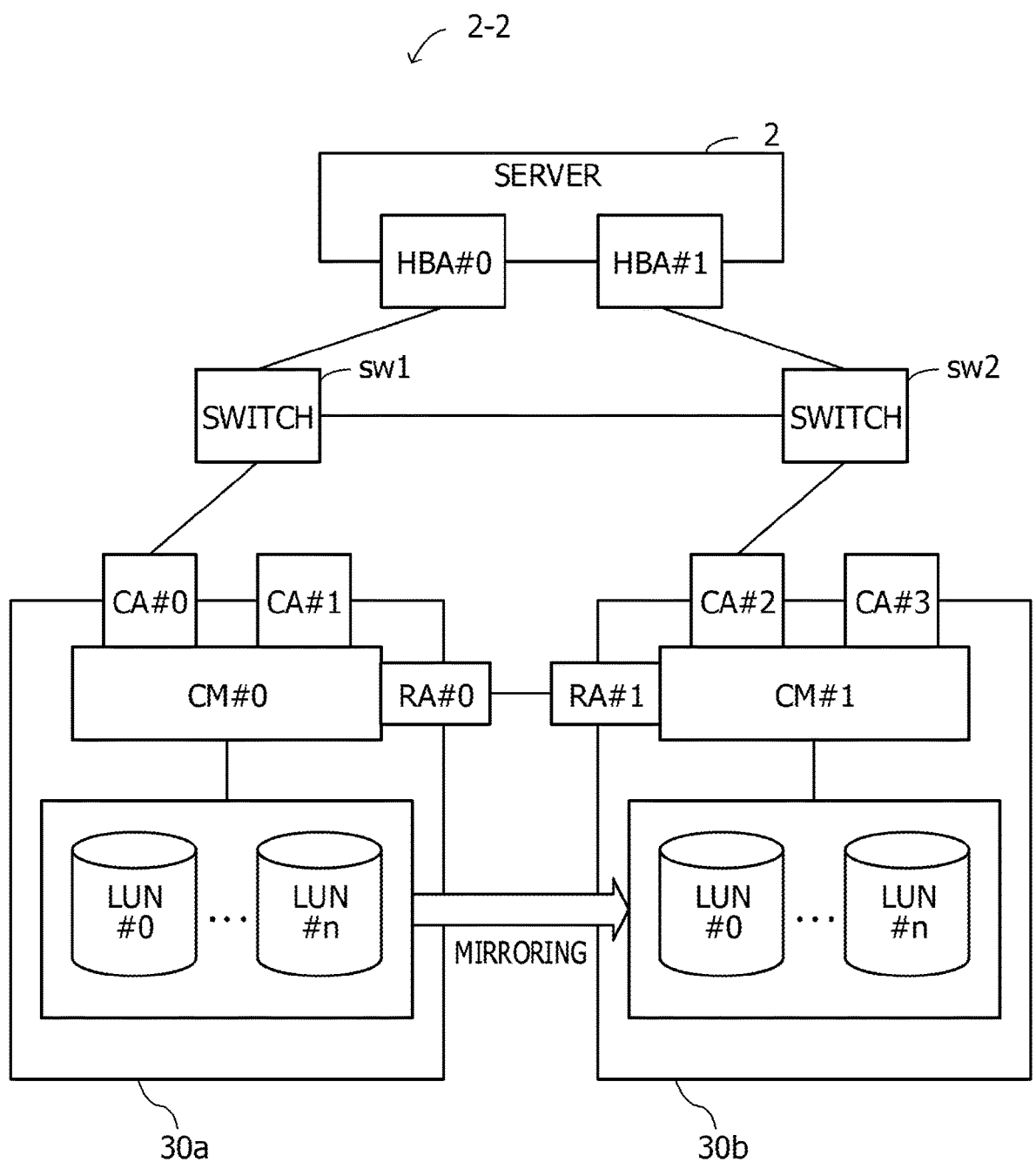
FIG. 3 is a diagram illustrating one example of a configuration of a storage system with plural storages.

Next, a storage cluster of an Active-Active system using a multipath will be described. FIG. 3 is a diagram illustrating one example of the configuration of a storage system with plural storages. A storage system 2-2 is what is obtained by expanding the multipath configuration with the single storage described above with FIG. 2 to the plural storages.

The storage system 2-2 includes the server 2, the switches sw1 and sw2, and storages 30a and 30b. The server 2 is equipped with HBAs #0 and #1.

The storage 30a includes CM #0 and LUNs #0, . . . , #n and the storage 30a is equipped with CAs #0 and #1 and remote adapter (RA) #0. The storage 30b includes CM #1 and LUNs #0, . . . and #n, and the storage 30b is equipped with CAs #2 and #3 and RA #1.

The RA is an adapter serving as an interface for Remote Advanced Copy of the storage.

The coupling relationship of the respective constituent elements is as follows. The switch sw1 is coupled to HBA #0 and CA #0 and the switch sw2 is coupled to HBA #1 and CA #2. Furthermore, the switches sw1 and sw2 are coupled to each other.

CAs #0 and #1 and RA #0 are mounted on CM #0 and CAs #2 and #3 and RA #1 are mounted on CM #1. RAs #0 and #1 are coupled to each other. Furthermore, LUNs #0, . . . and #n are put under the control of CM #0 and LUNs #0, . . . and #n are put under the control of CM #1.

In the storage system 2-2, storages are clustered and operate with the Active-Active system (storages 30a and 30b steadily operate). In such a system, control represented in the following (1) to (4) is carried out.

(1) LUNs #0, . . . and #n are generated in each of the storages 30a and 30b, and mirroring of data is carried out between the generated LUNs so that loss of data may be avoided at the time of failover. In the example of FIG. 3, mirroring of data is carried out from LUNs #0, . . . and #n of the storage 30a to LUNs #0, . . . and #n of the storage 30b.

(2) The identifies (for example, LUN_identification data (ID), Product_ID, SerialNumber, or the like) of the LUNs on the side of the storage 30b are made identical to the identifiers of the LUNs of the storage 30a and are sent to the server 2 as response. For example, the identifies of the LUNs on the side of the storage 30a are made to correspond with the identifies of the LUNs on the side of the storage 30b.

Based on this mechanism, the path to the LUN on the side of the storage 30a and the path to the LUN on the side of the storage 30b are recognized as a multipath to the same LUN by the server 2. For example, the LUN of the storage 30a and the LUN of the storage 30b can be depicted to the server 2 as the same volume.

(3) It is desired that, in the response to the Report TPGS command, information on all of paths incorporated in the multipath be returned to the server 2. Thus, the access state including the paths of both the storage 30a and the storage 30b is sent as the response to the Report TPGS command.

(4) Update data based on write I/O is reflected in the LUNs of both the storages 30a and 30b in order to allow access from the path of either the storage 30a or 30b (because mirroring is carried out between the storages 30a and 30b).

Furthermore, if write I/O to the storage 30a and write I/O to the storage 30b compete against each other, exclusive control is carried out in the copy source apparatus of the mirroring. In this example, the storage 30a is the copy source apparatus and thus the storage 30a carries out the exclusive control.

Figure 4:
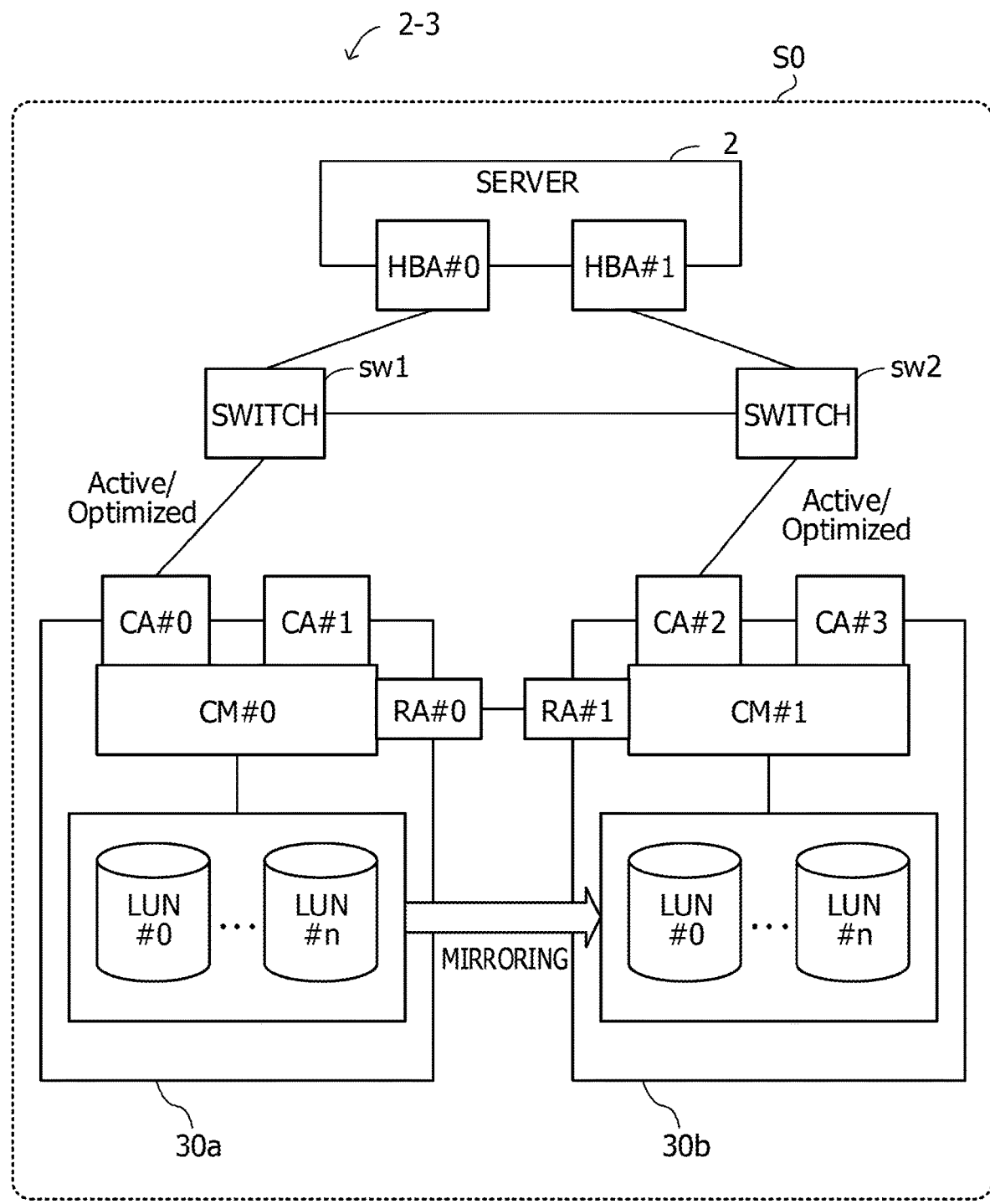
FIG. 4 is a diagram illustrating one example of a configuration of a storage system in which clustering is carried out in the same site.

Next, a storage system in which clustering is carried out in the same site will be described. FIG. 4 is a diagram illustrating one example of the configuration of a storage system in which clustering is carried out in the same site. A storage system 2-3 includes the same configuration as the storage system 2-2 illustrated in FIG. 3 but employs a configuration in which the whole system is included in one site S0 (for example, the same floor of a building, or the like).

In the storage system 2-3, the storages 30a and 30b are disposed in the same site S0 and thus a large difference in the access performance does not exist between the storages 30a and 30b. For this reason, it is more efficient that load balancing is carried out for both the storages 30a and 30b.

Therefore, response notifying that the paths of both the storages 30a and 30b are Active/Optimized is made.

Figure 5:
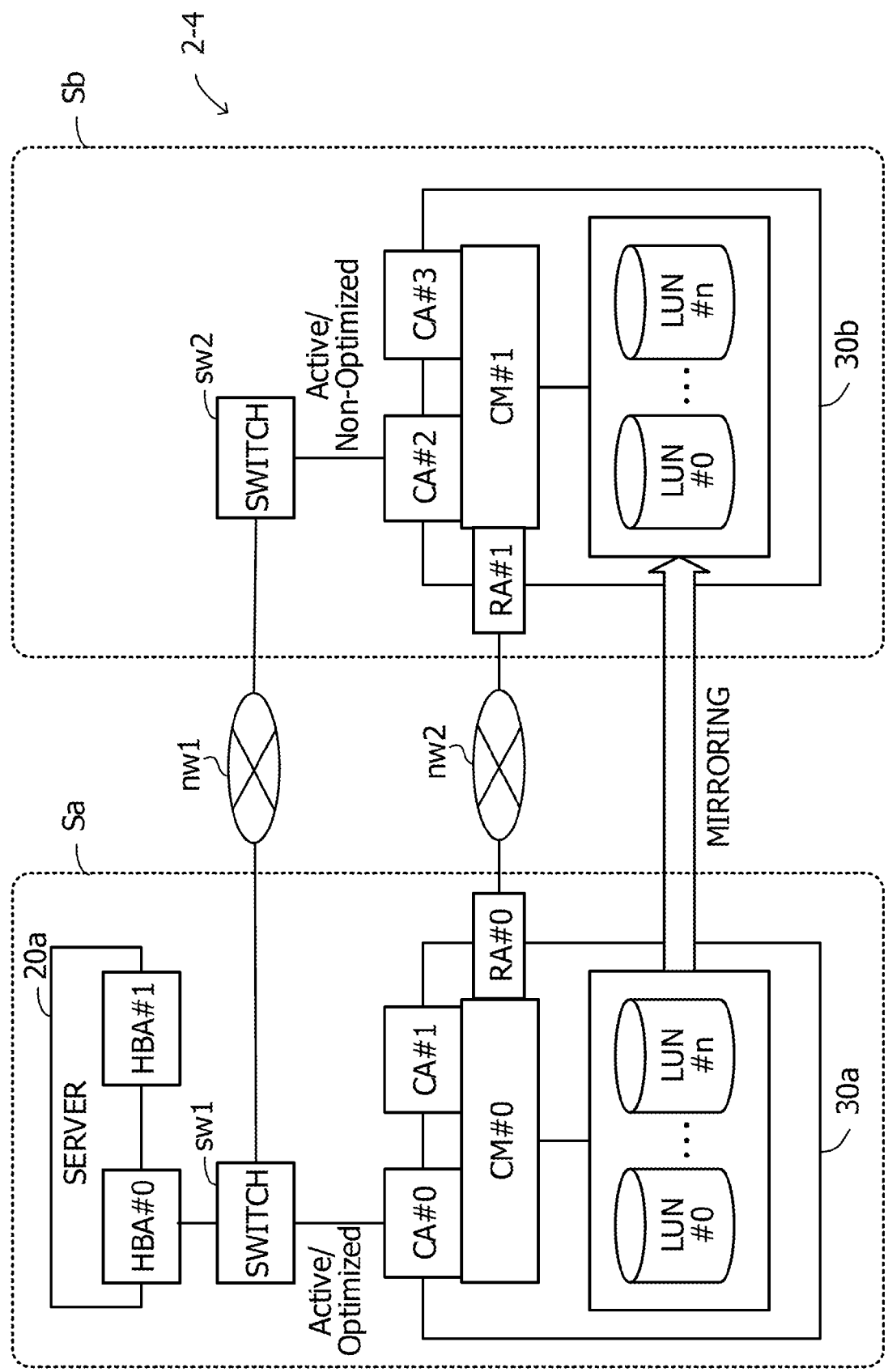
FIG. 5 is a diagram illustrating one example of a configuration of a storage system in which clustering is carried out between remote sites.

Next, storage systems in which clustering is carried out between remote sites will be described by using FIG. 5 and FIG. 6. FIG. 5 is a diagram illustrating one example of the configuration of the storage system in which clustering is carried out between remote sites. A storage system 2-4 includes the sites Sa and Sb coupled through networks (for example, wide area network (WAN)) nw1 and nw2. Suppose that the sites Sa and Sb are remotely disposed.

In the site Sa, the server 20a, the switch sw1, and the storage 30a are included. The server 20a is equipped with HBAs #0 and #1. The storage 30a includes CM #0 and LUNs #0, . . . , #n and the storage 30a is equipped with CAs #0 and #1 and RA #0.

In the site Sb, the switch sw2 and the storage 30b are included. The storage 30b includes CM #1 and LUNs #0, . . . and #n, and the storage 30b is equipped with CAs #2 and #3 and RA #1.

The coupling relationship of the respective constituent elements is as follows. The switch sw1 is coupled to HBA #0, CA #0, and the network nw1. The switch sw2 is coupled to the network nw1 and CA #2.

CAs #0 and #1 and RA #0 are mounted on CM #0 and CAs #2 and #3 and RA #1 are mounted on CM #1. RA #0 is coupled to the network nw2 and RA #1 is coupled to the network nw2. Furthermore, LUNs #0, . . . , #n are put under the control of CM #0, and LUNs #0, . . . and #n are put under the control of CM #1.

Here, in the storage system 2-4, the server 20a is disposed only in the site Sa due to clustering between the remote sites Sa and Sb. In this case, access from the server 20a to the storage 30b involves higher communication overhead than in access to the storage 30a. Thus, response notifying that the path to the storage 30a is Active/Optimized and the path to the storage 30b is Active/Non-Optimized is made.

Figure 6:
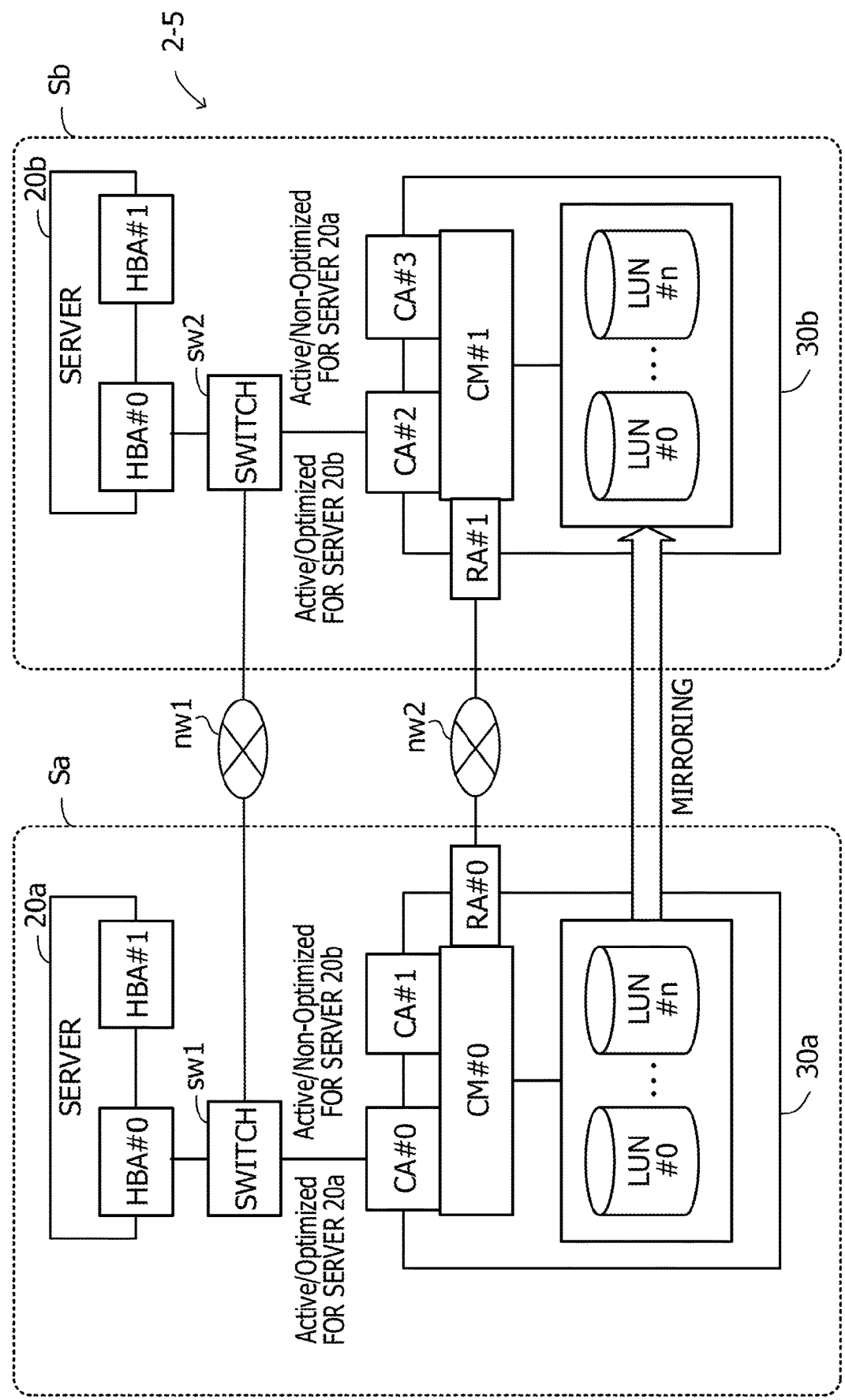
FIG. 6 is a diagram illustrating one example of a configuration of a storage system in which clustering is carried out between remote sites.

FIG. 6 is a diagram illustrating one example of the configuration of the storage system in which clustering is carried out between remote sites. A storage system 2-5 includes the sites Sa and Sb coupled through the networks nw1 and nw2.

In the site Sa, the server 20a, the switch sw1, and the storage 30a are included. In the site Sb, the server 20b, the switch sw2, and the storage 30b are included. The difference from the system of FIG. 5 is that a server (server 20b) is included also in the site Sb.

Here, in the storage system 2-5, the contents of response are changed for each server regarding the access state of the path. Thus, the storage 30a makes response notifying that the path for the server 20a is Active/Optimized and makes response notifying that the path for the server 20b is Active/Non-Optimized.

As the response to the Report TPGS command, for example, the storage 30a makes response notifying that the path that goes through HBA #0 of the server 20a and CA #0 is Active/Optimized to the servers 20a and 20b. Furthermore, the storage 30a makes response notifying that the path that goes through HBA #0 of the server 20b and CA #0 is Active/Non-Optimized to the servers 20a and 20b.

On the other hand, the storage 30b makes response notifying that the path for the server 20a is Active/Non-Optimized and makes response notifying that the path for the server 20b is Active/Optimized.

As the response to the Report TPGS command, for example, the storage 30b makes response notifying that the path that goes through HBA #0 of the server 20a and CA #2 is Active/Non-Optimized to the servers 20a and 20b. Furthermore, the storage 30b makes response notifying that the path that goes through HBA #0 of the server 20b and CA #2 is Active/Optimized to the servers 20a and 20b.

Figure 7:
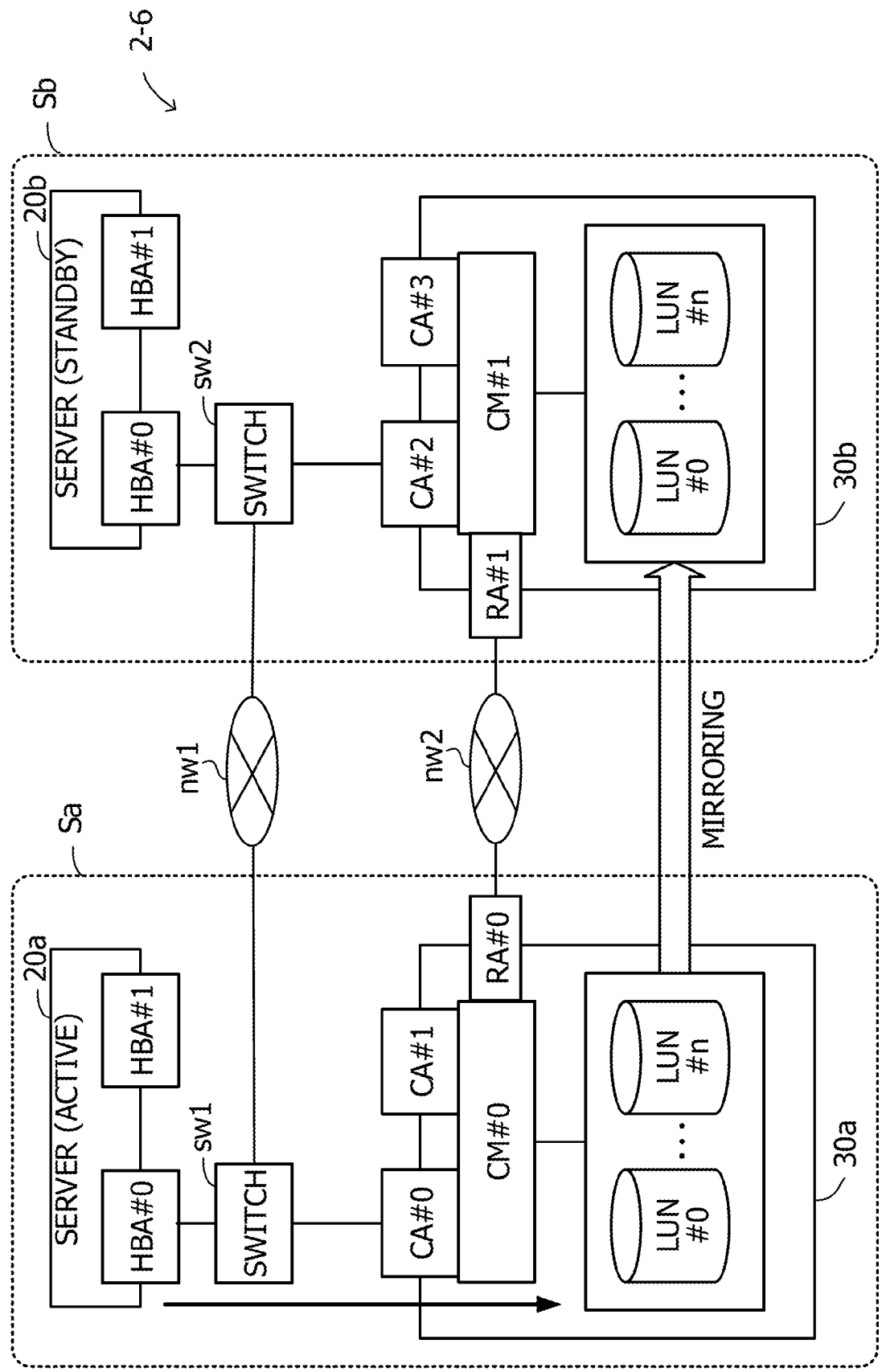
FIG. 7 is a diagram illustrating one example of a configuration of a storage system including an active server and a standby server.

Next, a description will be made about a problem of path control when switching of the server is carried out between clustered servers with use of FIG. 7 and FIG. 8. FIG. 7 is a diagram illustrating one example of the configuration of a storage system including an active server and a standby server.

A storage system 2-6 is the same as the configuration illustrated in FIG. 6. However, the case in which the server 20a is set active and the server 20b is set standby is represented (servers 20a and 20b are in an Active-Standby state).

When the server 20a is active, it is desirable to preferentially access the storage 30a in the same site Sa as the server 20a. Thus, the storage 30a makes response notifying that the path on the side of the storage 30a is Active/Optimized and the path on the side of the storage 30b is Active/Non-Optimized.

Furthermore, when servers are clustered, the plural clustered servers are treated like the same server. Thus, the storage 30b makes response notifying that the path on the side of the storage 30a is Active/Optimized and the path on the side of the storage 30b is Active/Non-Optimized also to the server 20b.

Figure 8:
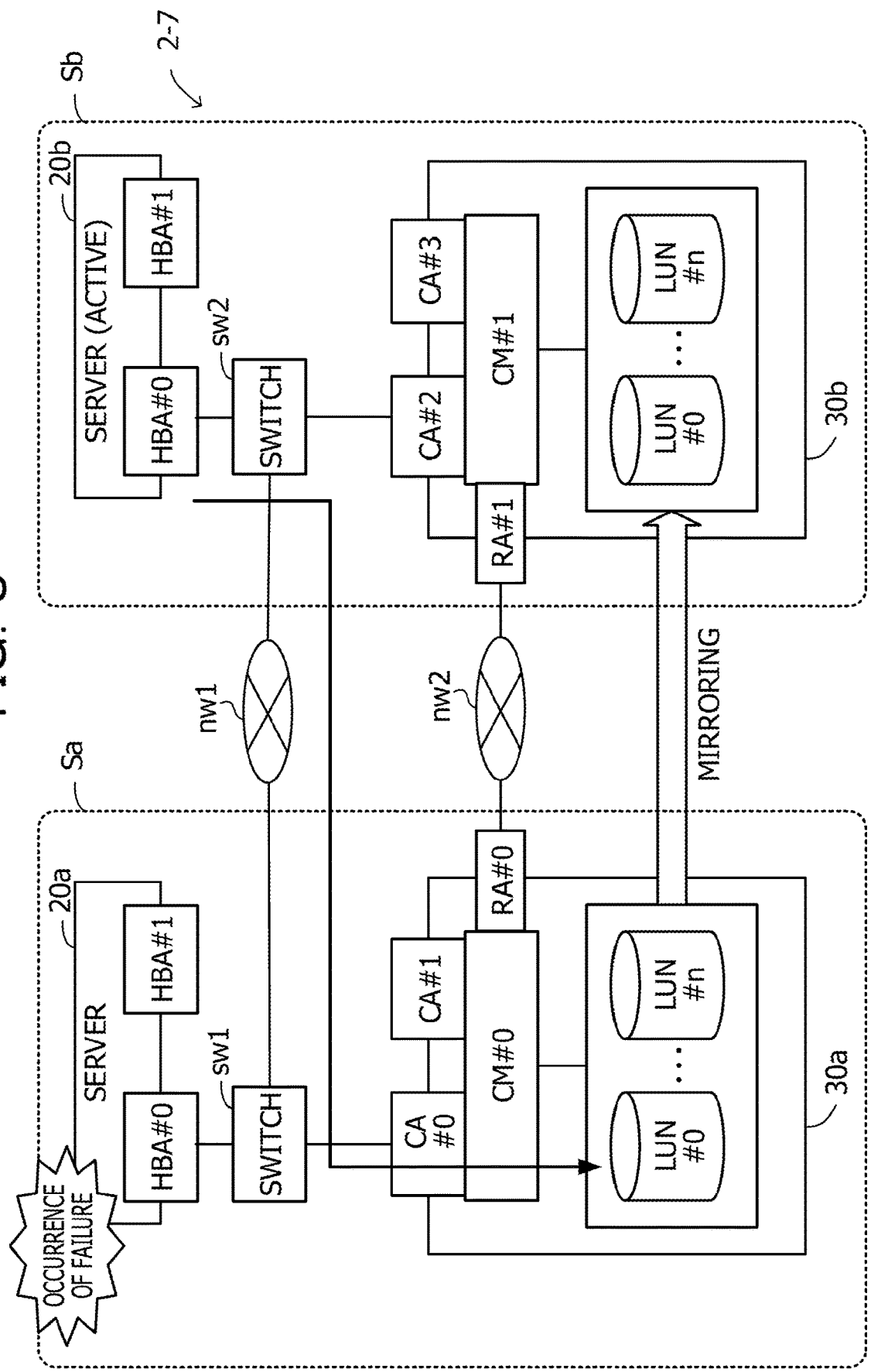
FIG. 8 is a diagram illustrating one example of a configuration of a storage system when failover of a server is carried out.

FIG. 8 is a diagram illustrating one example of the configuration of a storage system when failover of a server is carried out. A storage system 2-7 is in the state in which the server 20b has been switched from the standby state to the active state due to the occurrence of failure in the server 20a and server down thereof (or due to functioning of load balancing).

Immediately after the failover, access from the server 20b to the storage 30a is made and communication overhead occurs because this access leads to communication between the remote sites. As above, in the clustering between separate sites, the I/O response performance greatly changes depending on which storage is accessed. Thus, if the storage 30a detects the failover of the server, it is desirable for the storage 30a to notify the server 20b of the optimum path in conjunction with the detection of the failover.

In the case of detecting failover of the server, it is possible to detect the failover based on link-down of the path in the case of a configuration in which the server and the storage are directly coupled. However, in a configuration like the storage system 2-7, it is difficult for the storage 30a to detect the link-down of the path because the sites Sa and Sb are remotely located with the intermediary of the networks nw1 and nw2.

In this case, the path state after the failover is not notified to the side of the servers 20a and 20b by the storage 30a. Therefore, it is difficult for the server 20b after the failover to select the path with the lowest communication overhead and the lowering of the availability and the reliability occurs.

The present disclosure is made in view of such a point and is to provide a storage apparatus and system and a program that enable access to the path with the lowest communication overhead even after failover of the server.

Second Embodiment

Figure 9:
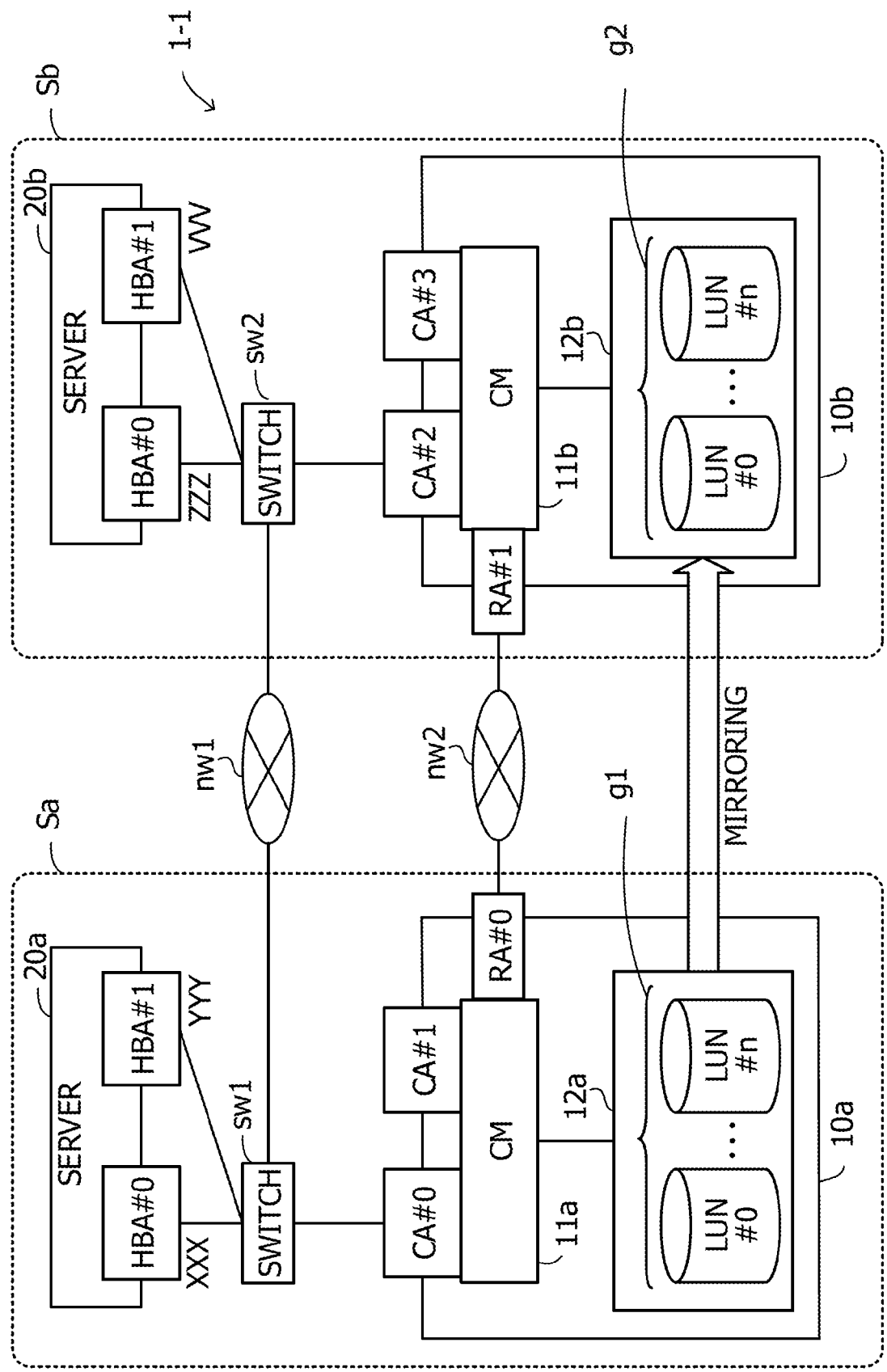
FIG. 9 is a diagram illustrating one example of a configuration of a storage system.

Next, a second embodiment will be described. First, the system configuration will be described. FIG. 9 is a diagram illustrating one example of the configuration of a storage system. A storage system 1-1 includes the sites Sa and Sb coupled through the networks nw1 and nw2. The sites Sa and Sb are remotely located.

In the site Sa, the server 20a, the switch sw1, and s storage apparatus 10a are included. The server 20a is equipped with HBAs #0 and #1. XXX in FIG. 9 is a port identifier of HBA #0 of the server 20a and YYY is a port identifier of HBA #1 of the server 20a.

The storage apparatus 10a includes a CM 11a and a storage unit 12a and the storage unit 12a includes LUNs #0, . . . and #n as storage areas. Furthermore, the storage apparatus 10a is equipped with CAs #0 and #1 and RA #0.

In the site Sb, the server 20b, the switch sw2, and a storage apparatus 10b are included. The server 20b is equipped with HBAs #0 and #1. ZZZ in FIG. 9 is a port identifier of HBA #0 of the server 20b and VVV is a port identifier of HBA #1 of the server 20b.

The storage apparatus 10b includes a CM 11b and a storage unit 12b and the storage unit 12b includes LUNs #0, . . . and #n as storage areas.

Furthermore, the storage apparatus 10b is equipped with CAs #2 and #3 and RA #1.

LUNs #0, . . . and #n of the storage unit 12a are included in an FO group g1 and LUNs #0, . . . and #n of the storage unit 12b are included in an FO group g2. The FO group is what is obtained by grouping plural LUNs in units of failover, and suppose that failover of LUNs that belong to the same FO group is collectively carried out.

The pieces of storage apparatus 10a and 10b include functions of the storage apparatus 1 in FIG. 1 and the CMs 11a and 11b include functions of the control unit 1b in FIG. 1. Furthermore, the storage units 12a and 12b correspond to the storing apparatus is in FIG. 1.

The coupling relationship of the respective constituent elements is as follows. The switch sw1 is coupled to HBA #0 and HBA #1 of the server 20a, CA #0, and the network nw1. The switch sw2 is coupled to HBA #0 and HBA #1 of the server 20b, the network nw1, and CA #2.

CAs #0 and #1 and RA #0 are set on the CM 11a and CAs #2 and #3 and RA #1 are set on the CM 11b. RA #0 is coupled to the network nw2 and RA #1 is coupled to the network nw2.

Furthermore, LUNs #0, . . . and #n of the storage unit 12a are put under the control of the CM 11a and LUNs #0, . . . and #n of the storage unit 12b are put under the control of the CM 11b.

In the description made hereinafter, the CMs 11a and 11b will be often referred to as the CM 11 when being generically represented and the storage units 12a and 12b will be often referred to as the storage unit 12 when being generically represented. Furthermore, the servers 20a and 20b will be often referred to as the server 20 when being generically represented.

<Hardware Configuration>

Figure 10:
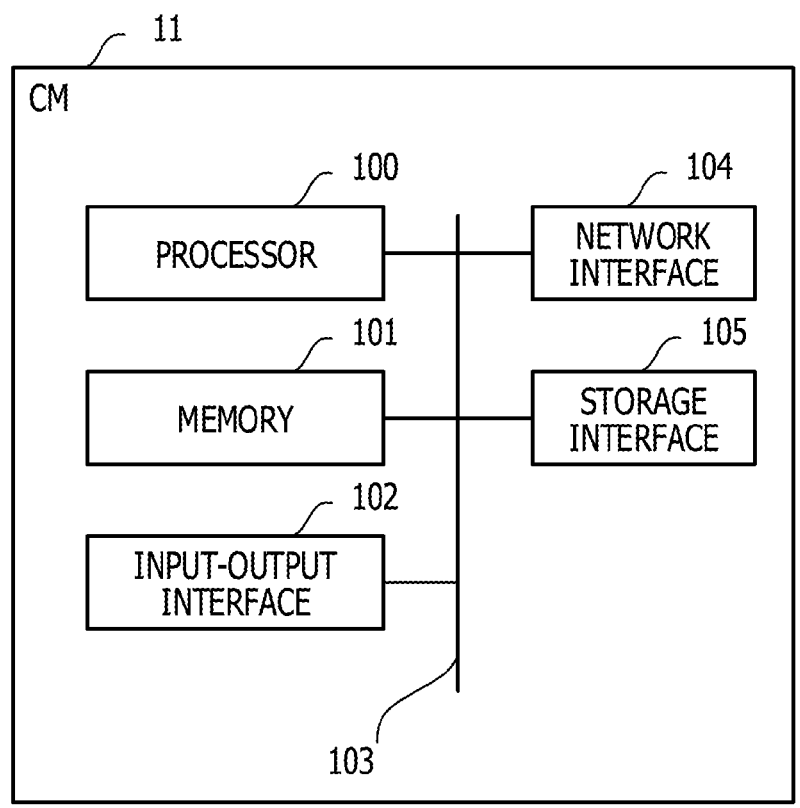
FIG. 10 is a diagram illustrating one example of a hardware configuration of a controller module (CM)

FIG. 10 is a diagram illustrating one example of the hardware configuration of the CM. For the CM 11, the whole apparatus is controlled by a processor 100. For example, the processor 100 functions as a control unit of the CM 11.

A memory 101 and plural pieces of peripheral equipment are coupled to the processor 100 through a bus 103. The processor 100 may be a multiprocessor. The processor 100 is a central processing unit (CPU), micro processing unit (MPU), digital signal processor (DSP), application specific integrated circuit (ASIC), or programmable logic device (PLD), for example. Furthermore, the processor 100 may be a combination of two or more elements among CPU, MPU, DSP, ASIC, and PLD.

The memory 101 is used as a main storing apparatus of the CM 11. In the memory 101, at least part of a program of an operating system (OS) or an application program which the processor 100 is caused to execute is temporarily stored. Furthermore, various kinds of messages for processing by the processor 100 are stored in the memory 101.

Moreover, the memory 101 is used also as an auxiliary storing apparatus of the CM 11 and the program of the OS, application programs, and various kinds of messages are stored therein. The memory 101 may include a semiconductor storing apparatus such as flash memory and SSD and a magnetic recording medium such as HDD as the auxiliary storing apparatus.

As the peripheral equipment coupled to the bus 103, an input-output interface 102 and a network interface 104 exist. To the input-output interface 102, a monitor (for example, light emitting diode (LED), liquid crystal display (LCD), or the like) functioning as display apparatus that displays the state of the CM 11 in accordance with a command from the processor 100 is coupled.

Furthermore, information input apparatus such as keyboard and mouse can be coupled to the input-output interface 102 and the input-output interface 102 transmits a signal sent from the information input apparatus to the processor 100.

The input-output interface 102 functions as a communication interface for coupling peripheral equipment. For example, optical drive apparatus that reads messages recorded on an optical disc by using laser light or the like can be coupled to the input-output interface 102.

The optical disc is a portable recording medium on which messages are recorded in such a manner as to be readable through reflection of light. As the optical discs, there are Blu-ray Disc (registered trademark), compact disc read only memory (CD-ROM), CD-R (Recordable)/RW (Rewritable), and so forth.

Furthermore, memory apparatus and a memory reader-writer can be coupled to the input-output interface 102. The memory apparatus is a recording medium equipped with a function of communication with the input-output interface 102. The memory reader-writer is apparatus that writes a message to a memory card or reads out a message from the memory card. The memory card is a card-type recording medium.

The network interface 104 carries out interface control with the networks nw1 and nw2 and interface control with the servers 20a and 20b through CAs #0, . . . and #3 and RAs #0 and #1 illustrated in FIG. 9.

The network interface 104 includes functions of a network interface card (NIC), a wireless local area network (local area network (LAN)), or the like for example. Signals, messages, and so forth received by the network interface 104 are output to the processor 100. A storage interface 105 carries out interface control with the storage units 12a and 12b illustrated in FIG. 9.

The processing functions of the CM 11 can be implemented by the above hardware configuration. For example, the CM 11 can carry out control of the present disclosure by executing a program recorded on a recording medium readable by the processor 100.

The program in which the contents of processing which the CM 11 is caused to execute are described can be recorded in various recording media. For example, the program which the CM 11 is caused to execute can be stored in the auxiliary storing apparatus.

The processor 100 loads at least part of the program in the auxiliary storing apparatus into the main storing apparatus and executes the program. Furthermore, it is also possible to record the program on a portable recording medium such as an optical disc, memory apparatus, or memory card. For example, the program stored in the portable recording medium becomes executable after being installed on the auxiliary storing apparatus by control from the processor 100. Furthermore, it is also possible for the processor 100 to read out the program directly from the portable recording medium and execute the program.

<Functional Blocks>

Figure 11:
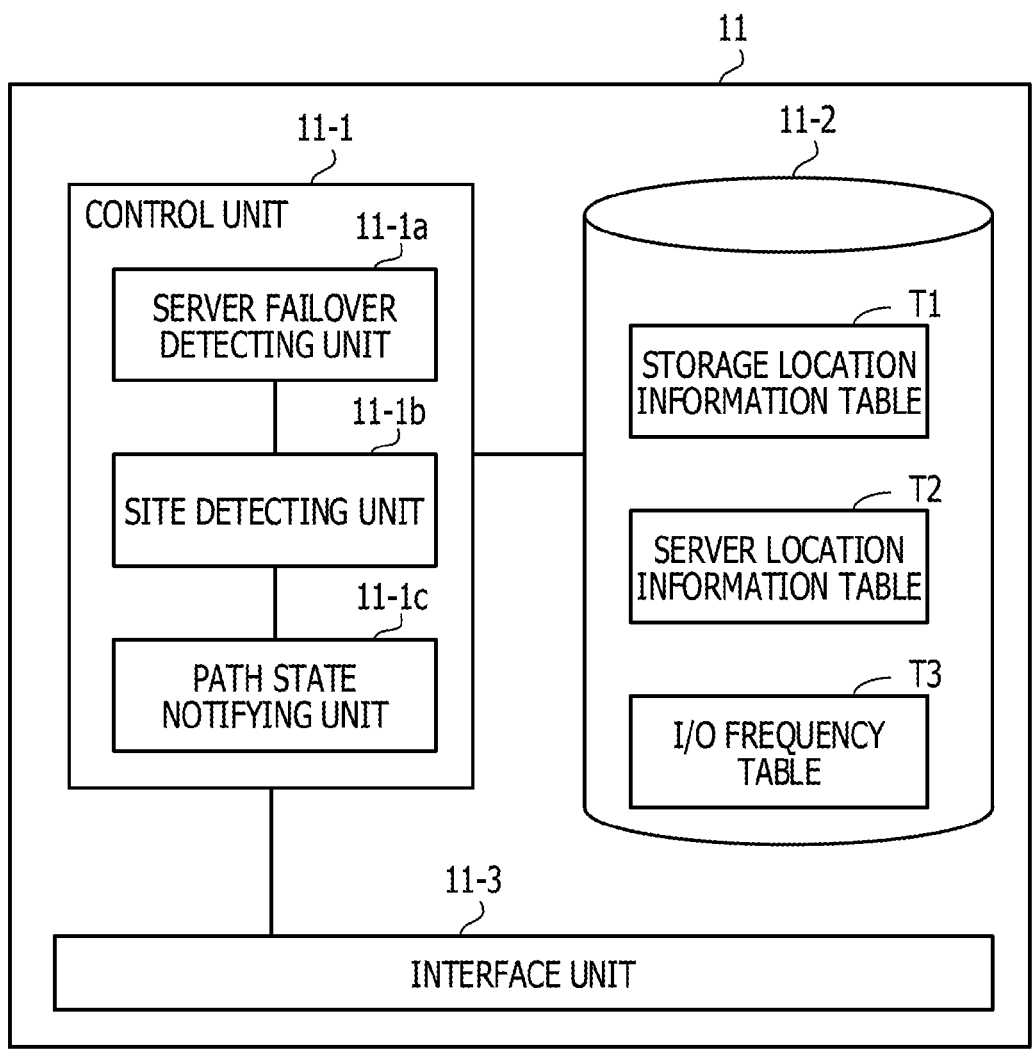
FIG. 11 is a diagram illustrating one example of functional blocks of a CM.

FIG. 11 is a diagram illustrating one example of functional blocks of the CM. The CM 11 includes a control unit 11-1, a storing unit 11-2, and an interface unit 11-3. The control unit 11-1 includes a server failover detecting unit 11-1a, a site detecting unit 11-1b, and a path state notifying unit 11-1c.

The server failover detecting unit 11-1a monitors a first number of accesses from the server 20a to the storage unit 12a and a second number of accesses from the server 20b to the storage unit 12a.

Then, if determining that the second number of accesses surpasses the first number of accesses, the server failover detecting unit 11-1a detects that failover from the server 20a to the server 20b has occurred.

The site detecting unit 11-1b detects the sites in which the storage units 12a and 12b are disposed and the sites in which the servers 20a and 20b are disposed based on location information that represents the location relationship between the storage units 12a and 12b and the servers 20a and 20b.

If the site Sa in which the storage unit 12a is located and the site Sb in which the server 20b after the failover is located are different, the path state notifying unit 11-1c notifies the server 20b of information to change the access destination to the storage unit 12b disposed in the site Sb.

The storing unit 11-2 includes a storage location information table T1, a server location information table T2, and an I/O frequency table T3. Details of these tables will be described later with FIG. 12 to FIG. 14.

Furthermore, the storing unit 11-2 stores also control information relating to overall operation of the CM 11 and so forth.

The interface unit 11-3 carries out interface control with the server or network through the CA or RA and interface control with the storage unit 12.

The control unit 11-1 is implemented by the processor 100 illustrated in FIG. 10 and the storing unit 11-2 is implemented by the memory 101 illustrated in FIG. 10. Furthermore, the interface unit 11-3 is implemented by the network interface 104 or the storage interface 105 illustrated in FIG. 10.

<Table Information>

Figure 12:
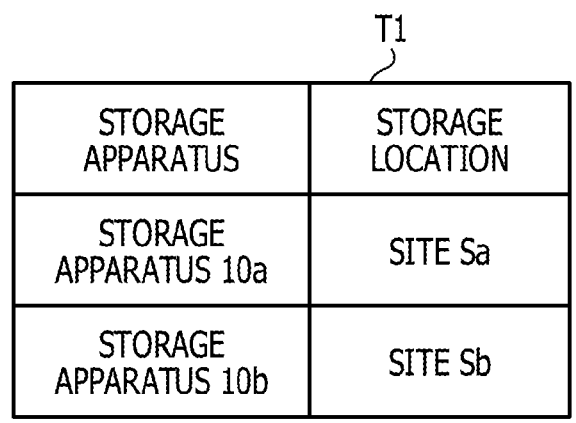
FIG. 12 is a diagram illustrating one example of a storage location information table.

Next, table information which the CM 11 has will be described by using FIG. 12 to FIG. 14. FIG. 12 is a diagram illustrating one example of the storage location information table. The storage location information table T1 includes "storage apparatus" and "storage location" as items and location information of the pieces of storage apparatus 10a and 10b is registered. In the storage location information table T1 of this example, information indicating that the storage apparatus 10a is located in the site Sa and the storage apparatus 10b is located in the site Sb is registered. The location information of the storage unit may be registered as "storage unit" instead of "storage apparatus."

Figure 13:
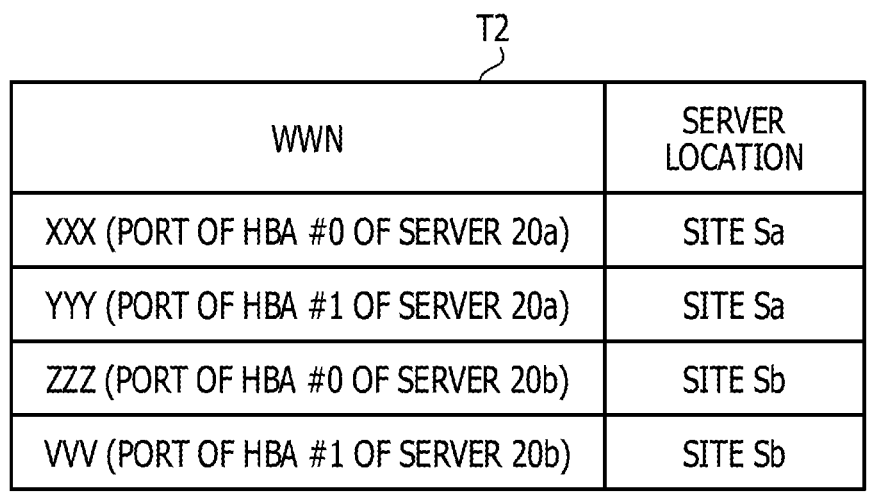
FIG. 13 is a diagram illustrating one example of a server location information table.

FIG. 13 is a diagram illustrating one example of the server location information table. The server location information table T2 includes "World Wide Name (WWN)" and "server location" as items. In this example, the port identifiers of the servers 20a and 20b coupled to the pieces of storage apparatus 10a and 10b are employed as the WWN.

In the server location information table T2, information indicating that the WWN of the port of HBA #0 of the server 20a is XXX and this port is located in the site Sa is registered, and information indicating that the WWN of the port of HBA #1 of the server 20a is YYY and this port is located in the site Sa is registered.

Moreover, information indicating that the WWN of the port of HBA #0 of the server 20b is ZZZ and this port is located in the site Sb is registered, and information indicating that the WWN of the port of HBA #1 of the server 20b is VVV and this port is located in the site Sb is registered. As above, for the server ports, which site each port is disposed in is registered.

FIG. 14 is a diagram illustrating one example of the I/O frequency table. The I/O frequency table T3 includes "FO group," "frequency of I/O from site Sa," and "frequency of I/O from site Sb" as items.

The identifier of the FO group is registered in "FO group." The total number of times of I/O from all WWNs of the server located in the site Sa is registered in "frequency of I/O from site Sa." The total number of times of I/O from all WWNs of the server located in the site Sb is registered in "frequency of I/O from site Sb."

In the CM 11, the frequency of I/O from each site is counted and is registered in the I/O frequency table T3 regarding each FO group. The frequencies of I/O are cleared in units of given time. For example, the CM 11 counts the frequency of I/O from each site and clears the frequencies of I/O every minute. In this case, the frequencies of I/O in one minute are obtained.

As a way of aggregation into the FO groups, for example, LUNs with the same access source server carry out failover in conjunction with each other and therefore are aggregated into one FO group and LUNs different in the access source server are separated into another FO group.

<Operation of Storage System>

Figure 15:
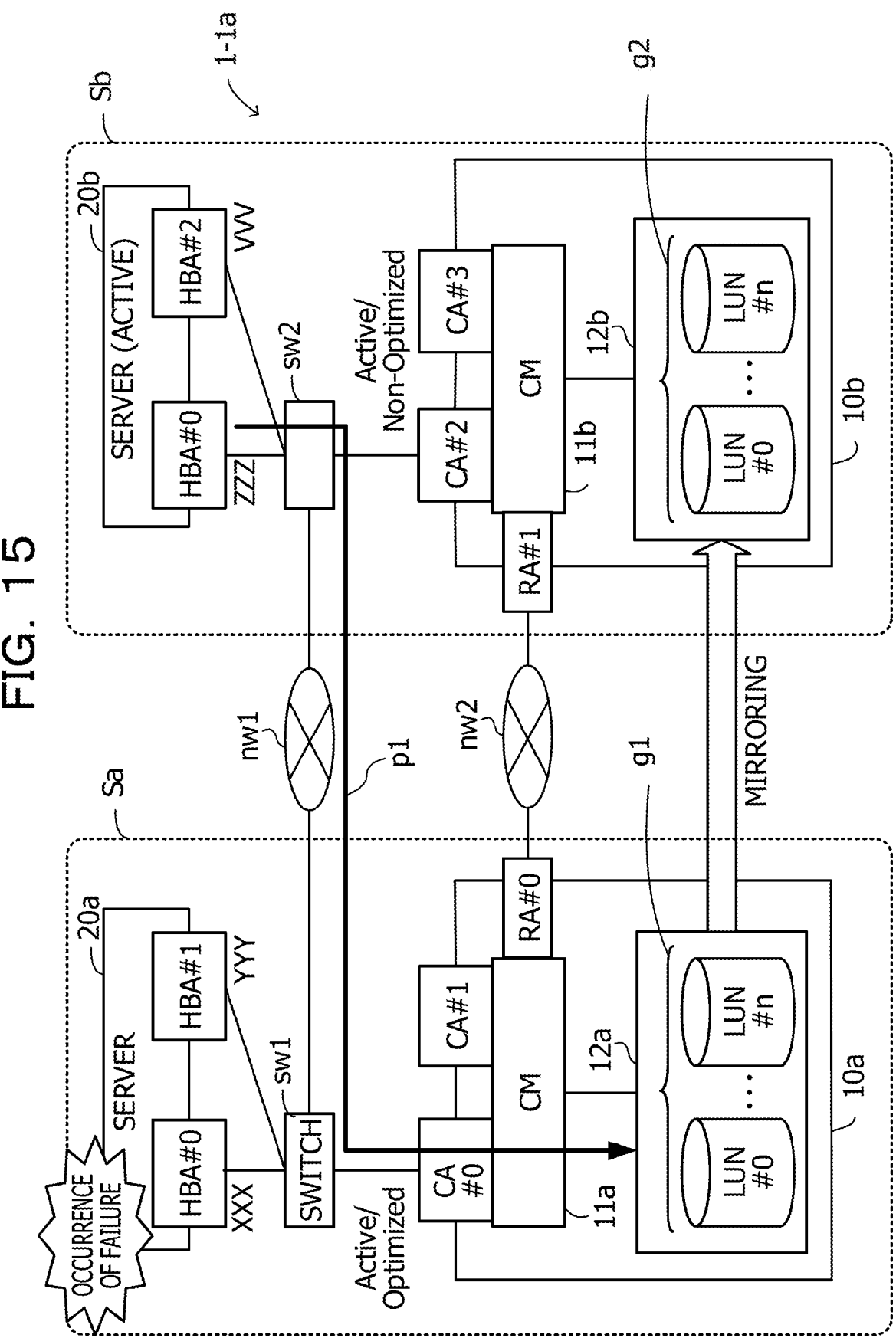
FIG. 15 is a diagram illustrating one example of operation of a storage system.

Next, operation of storage systems will be described by using FIG. 15 and FIG. 16. FIG. 15 is a diagram illustrating one example of operation of a storage system. Suppose that, in a storage system 1-1a, failover of the server 20b from the standby state to the active state occurs due to failure of the server 20a that has been active or operation of the function of load balancing.

The path state immediately after the failover does not change from the path state before the failover. The path on the side of the storage apparatus 10a is Active/Optimized and the path on the side of the storage apparatus 10b is Active/Non-Optimized.

Furthermore, as an active path that leads to the storage unit 12a when the server 20b has become active, there is an active path p1 in FIG. 15, for example. The active path p1 is a path that goes through HBA #0 of the server 20b, the switch sw2, the network nw1, the switch sw1, CA #0, and the CM 11a.

Here, the CM 11a steadily counts the frequency of I/O to the storage unit 12a. When the server 20b has become active, the CM 11a detects that I/O access from the server 20b to the storage unit 12a increases.

For example, the CM 11a can detect that "frequency of I/O from site Sb" to the FO group g1 in the given time has surpassed "frequency of I/O from site Sa."

Furthermore, the CM 11a in the storage apparatus 10a recognizes that the CM 11a is disposed in the site Sa. Thus, the CM 11a determines that access from the site Sb other than the site Sa has increased, and executes failover processing of the FO group g1.

The frequency of I/O is recorded in each of the CM 11a of the storage apparatus 10a and the CM 11b of the storage apparatus 10b. Thus, the failover processing is activated if either storage apparatus detects that access from the opposite site (site other than the site in which this storage apparatus is located) has increased. In this case, when pieces of information contradicting each other between the pieces of storage apparatus 10a and 10b are obtained, the storage apparatus determines that an abnormality exists, and does not execute the failover processing of the storage.

For example, the storage apparatus 10b, which is opposing apparatus disposed in the site Sb, monitors a third number of accesses from the server 20a to the storage unit 12b and a fourth number of accesses from the server 20b to the storage unit 12b, and transmits the monitoring result to the storage apparatus 10a.

Furthermore, the CM 11a in the storage apparatus 10a obtains a first comparison result between the first number of accesses from the server 20a to the storage unit 12a and the second number of accesses from the server 20b to the storage unit 12a. The CM 11a receives a second comparison result between the third number of accesses and the fourth number of accesses, transmitted from the storage apparatus 10b.

Then, if determining that the first and second comparison results are incongruent, the CM 11a does not notify the server 20b of change in the access destination and does not execute the failover processing of the storage. As above, if contradiction exists in the results of monitoring by both the pieces of storage apparatus 10a and 10b, the storage apparatus 10a determines that an abnormality exists and keeps the present access state.

Figure 16:
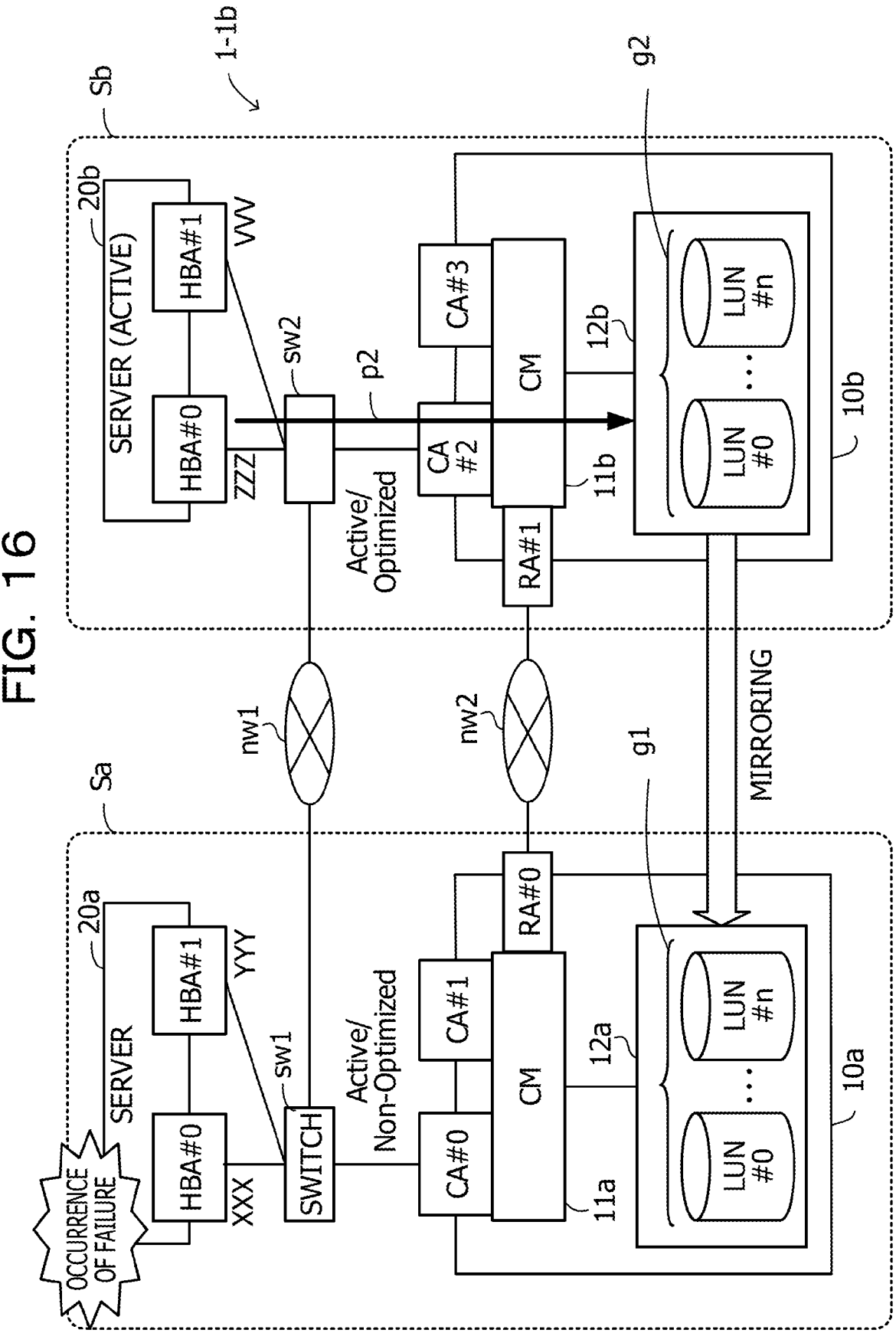
FIG. 16 is a diagram illustrating one example of operation of a storage system.

FIG. 16 is a diagram illustrating one example of operation of a storage system. Normally the storage apparatus makes response of a sense of Asymmetric Access State Changed (0x6 0x2a 0x6) in response to I/O from the server. When receiving the sense, the server issues the Report TPGS command to the storage apparatus.

In a storage system 1-1b, the CM 11a executes failover processing of the FO group g1 when detecting that the frequency of I/O from the site Sb has become larger than the frequency of I/O from the site Sa, in which the CM 11a is disposed.

For example, as the failover processing of the FO group g1, the CM 11a makes response to the server 20b with the port on the side of the storage 10b set Active/Optimized in response to the Report TPGS command from the server 20b. Moreover, the CM 11a makes response to the server 20b with the port on the side of the storage 10a set Active/Non-Optimized.

The server 20b preferentially selects the Active/Optimized path. Therefore, after receiving the response, the server 20b issues I/O to the storage apparatus 10b. For example, there is an active path p2 as a path through which the server 20b and the storage apparatus 10b are coupled.

The active path p2 is a path that goes through HBA #0 of the server 20b, the switch sw2, CA #2, and the CM 11b. Furthermore, the storage apparatus 10b inverts the direction of mirroring and exclusive control is carried out in the storage apparatus 10b.

<Storage System in which Multipaths are Formed In Sites>

Figure 17:
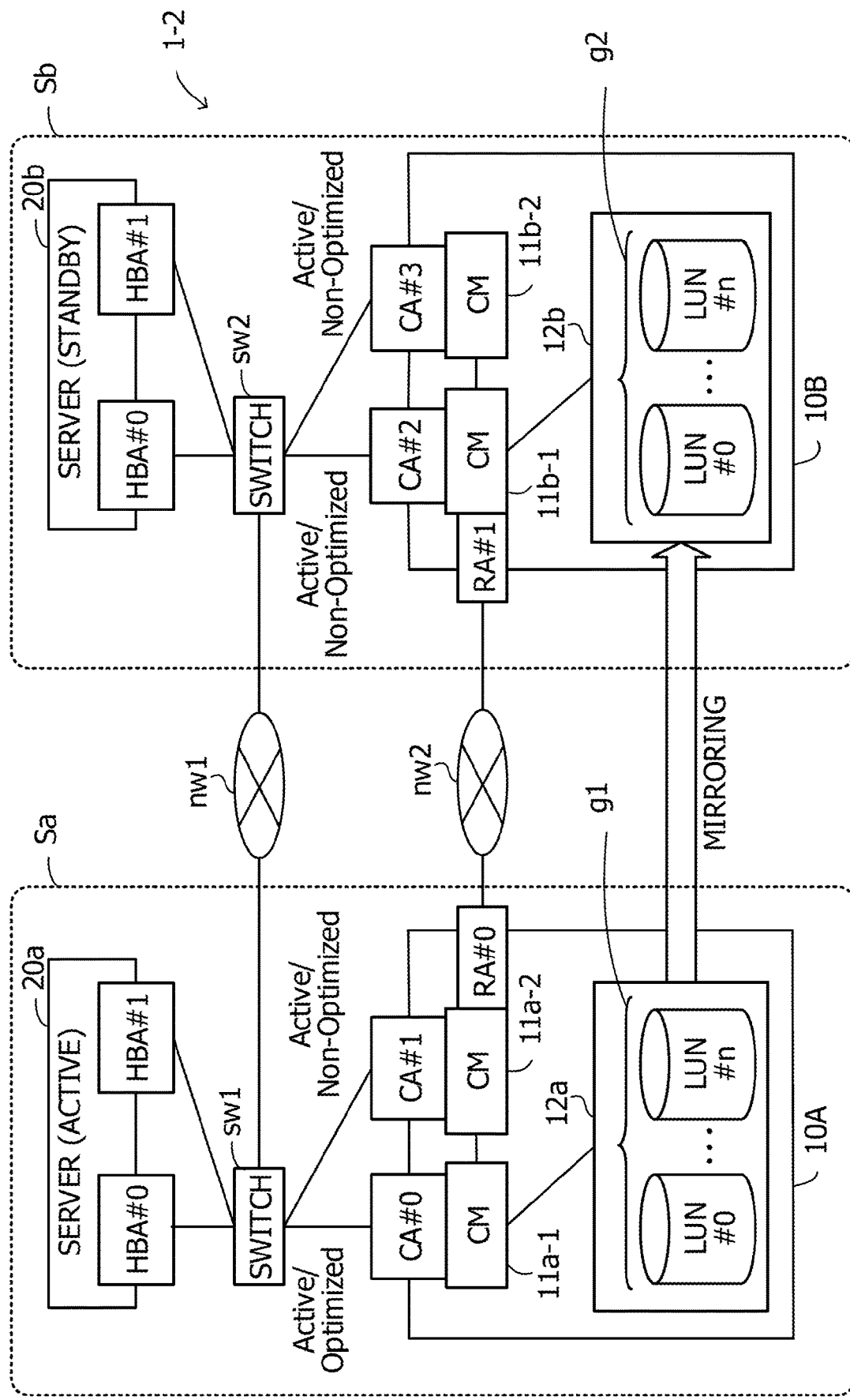
FIG. 17 is a diagram illustrating one example of a configuration of a storage system in which multipaths are formed in sites.

FIG. 17 is a diagram illustrating one example of the configuration of a storage system in which multipaths are formed in sites. In the above-described configuration examples of the storage system, the path between the server and the storage apparatus in each site is simplified as one path. However, it is also possible to set plural ports as ports of each of the server and the storage apparatus and couple the server and the storage apparatus by a multipath.

A storage system 1-2 includes the sites Sa and Sb coupled through the networks nw1 and nw2. In the site Sa, the server 20a, the switch sw1, and storage apparatus 10A are included. The server 20a is equipped with HBAs #0 and #1.

The storage apparatus 10A includes CMs 11a-1 and 11a-2 and the storage unit 12a and the storage unit 12a includes LUNs #0, . . . and #n as storage areas. Furthermore, the storage apparatus 10A is equipped with CAs #0 and #1 and RA #0.

In the site Sb, the server 20b, the switch sw2, and storage apparatus 10B are included. The server 20b is equipped with HBAs #0 and #1. The storage apparatus 10B includes CMs 11b-1 and 11b-2 and the storage unit 12b and the storage unit 12b includes LUNs #0, . . . and #n as storage areas. Furthermore, the storage apparatus 10B is equipped with CAs #2 and #3 and RA #1.

The coupling relationship of the respective constituent elements is as follows. The switch sw1 is coupled to HBAs #0 and #1 of the server 20a, CAs #0 and #1, and the network nw1. The switch sw2 is coupled to HBAs #0 and #1 of the server 20b, the network nw1, and CAs #2 and #3.

CA #0 is mounted on the CM 11a-1 and CA #1 and RA #0 are mounted on the CM 11a-2. The CMs 11a-1 and 11a-2 are coupled to each other. CA #2 and RA #1 are mounted on the CM 11b-1 and CA #3 is mounted on the CM 11b-2. The CMs 11b-1 and 11b-2 are coupled to each other. Furthermore, RA #0 is coupled to the network nw2 and RA #1 is coupled to the network nw2.

Furthermore, LUNs #0, . . . and #n of the storage unit 12a are put under the control of the CM 11a-1 and LUNs #0, . . . and #n of the storage unit 12b are put under the control of the CM 11b-1.

In the storage system 1-2 including such a configuration, possibly a preferential path exists in each site. In this example, in the site Sa in which the active server 20a is disposed, LUNs #0, . . . and #n in the storage unit 12a are under the control of the CM 11a-1.

For this reason, the access path that goes through CA #0 serving as the port on the CM 11a-1 is the preferential path. In this case, only the access path that goes through CA #0 of the site Sa can become Active/Optimized.

On the other hand, if the server 20b of the site Sb becomes active and failover processing is executed from the storage apparatus 10A to the storage apparatus 10B, only the access path that goes through CA #2 becomes Active/Optimized.

<Flowchart>

Figure 18:
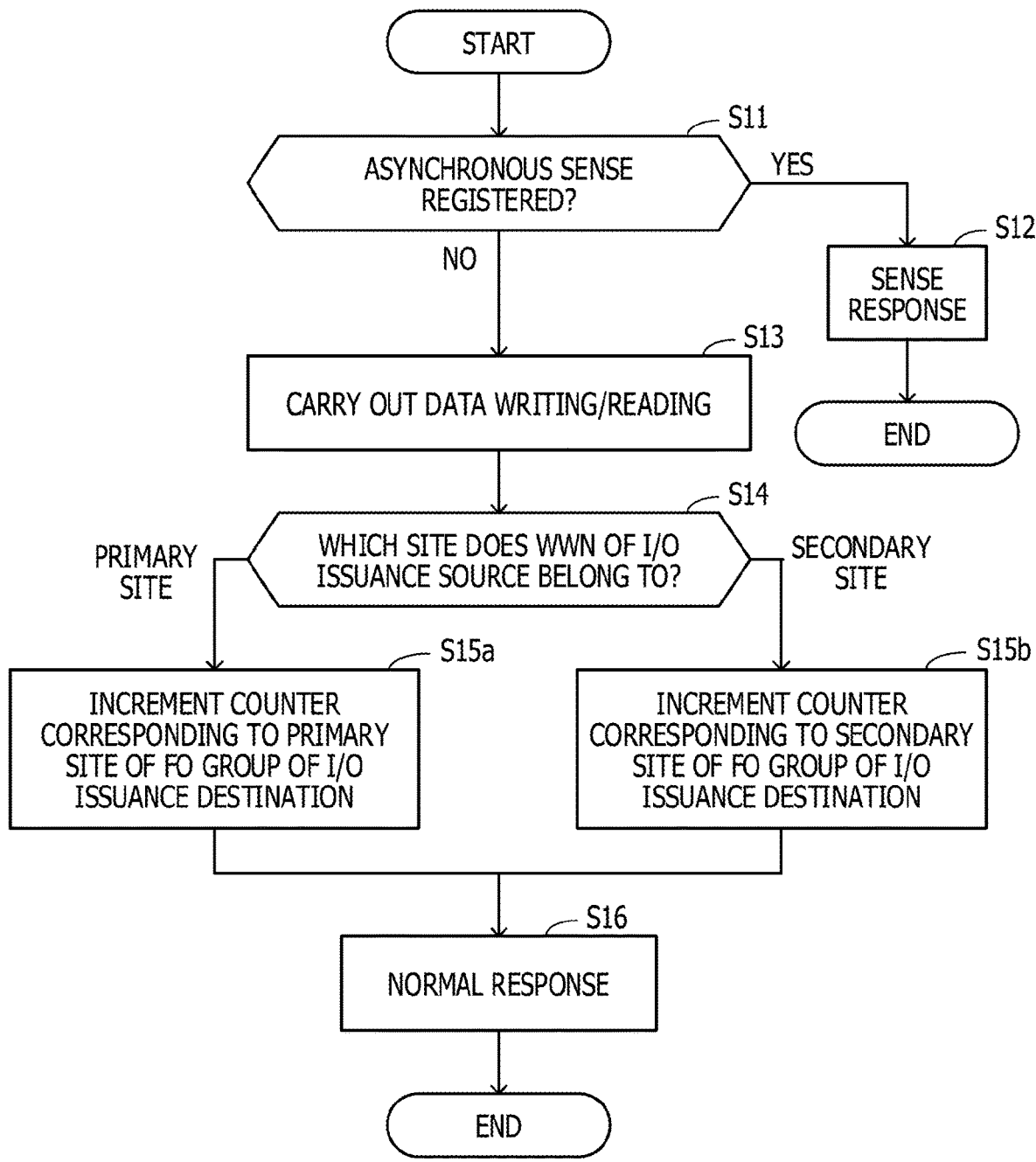
FIG. 18 is a flowchart illustrating operation of a CM in I/O processing.

Next, operation will be described by using flowcharts illustrated in FIG. 18 to FIG. 20. FIG. 18 is a flowchart illustrating operation of the CM in I/O processing. The following operation is carried out by the CMs 11a and 11b concurrently.

[Step S11] The control unit 11-1 in the CM 11 discriminates whether or not an asynchronous sense notifying the server 20 of that the access state of the LUNs has been changed is registered in the storing unit 11-2 in the CM 11 (or in the storage unit 12). If the asynchronous sense is registered, the processing proceeds to a step S12. If the asynchronous sense is not registered, the processing proceeds to a step S13.

[Step S12] The control unit 11-1 makes response of a sense of the above-described Asymmetric Access State Changed (0x60x2a 0x6) to the server 20.

[Step S13] The control unit 11-1 executes data writing/reading processing on the storage unit 12.

[Step S14] The control unit 11-1 refers to the location of the server 20 from the server location information table T2 and detects which site the WWN of the I/O issuance source belongs to. If this WWN belongs to the primary site (site in which the active server is disposed), the processing proceeds to a step S15a. If this WWN belongs to the secondary site (site in which the standby server is disposed), the processing proceeds to a step S15b.

[Step S15a] The control unit 11-1 increments a counter corresponding to the primary site of the FO group of the I/O issuance destination and registers the result in the I/O frequency table T3.

[Step S15b] The control unit 11-1 increments a counter corresponding to the secondary site of the FO group of the I/O issuance destination and registers the result in the I/O frequency table T3.

[Step S16] The control unit 11-1 transmits normal response to the I/O processing to the server 20.

Figure 19:
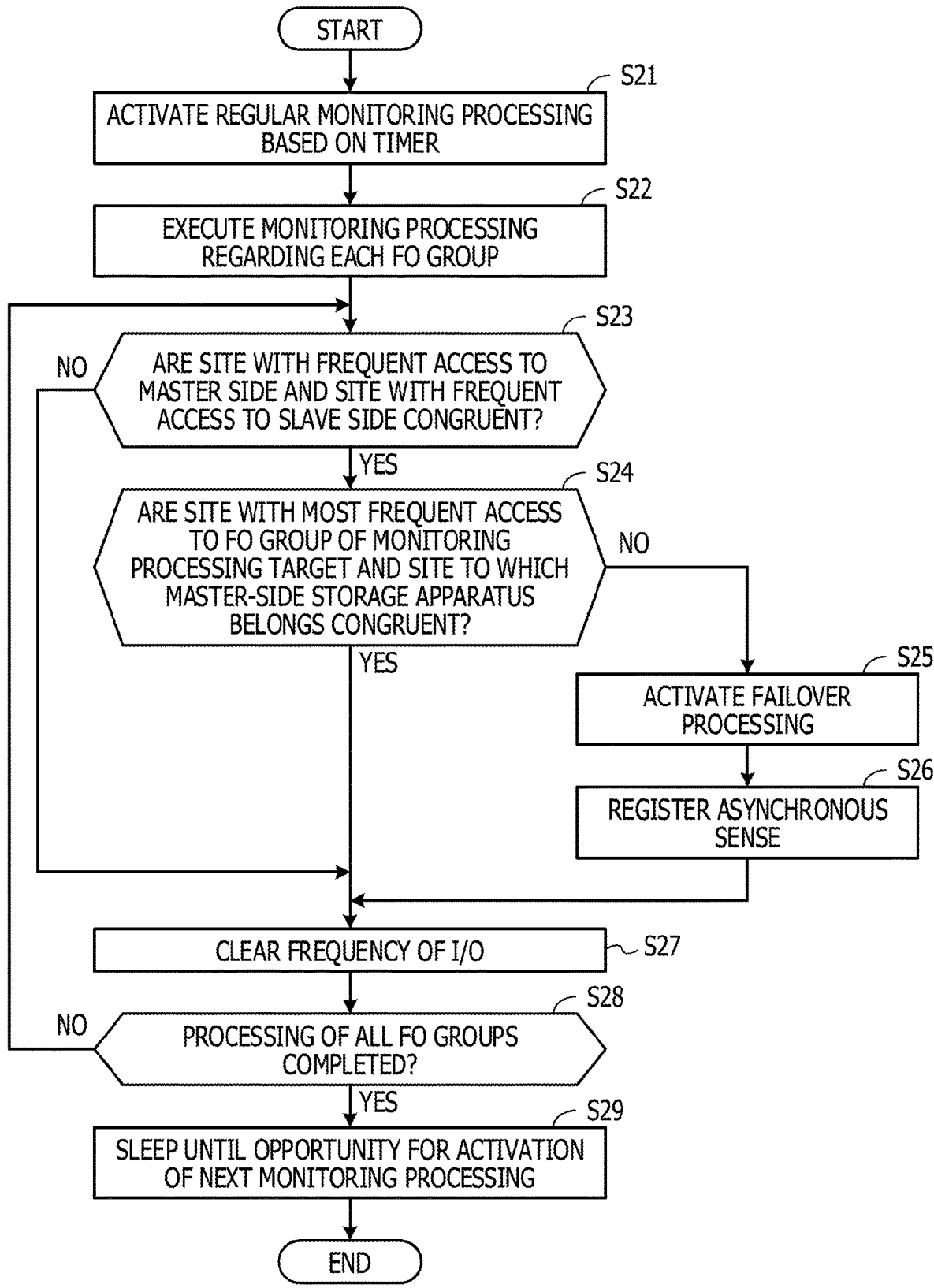
FIG. 19 is a flowchart illustrating operation of regular monitoring processing (master side)

FIG. 19 is a flowchart illustrating operation of regular monitoring processing. In the description made hereinafter, the copy source storage apparatus of mirroring and the server located in the site in which the copy source storage apparatus is located are deemed as the master. Furthermore, the copy destination storage apparatus and the server located in the site in which the copy destination storage apparatus is located are deemed as the slave. The following flow of FIG. 19 represents the operation of the CM in the storage apparatus on the master side.

[Step S21] The control unit 11-1 activates the regular monitoring processing based on a timer.

[Step S22] The control unit 11-1 carries out monitoring processing regarding each FO group.

[Step S23] The control unit 11-1 discriminates whether or not the site with the most frequent access to the master side and the site with the most frequent access to the slave side are congruent. For example, the control unit 11-1 discriminates whether the present state is not the state in which the pieces of information on the master side and the slave side are incongruent. If the sites are congruent, the processing proceeds to a step S24. If the sites are incongruent, the processing proceeds to a step S27.

[Step S24] The control unit 11-1 discriminates whether or not the site with the most frequent access to the FO group of the monitoring processing target and the site to which the master-side storage apparatus belongs are congruent. If the sites are congruent, the processing proceeds to the step S27. If the sites are not congruent, the processing proceeds to a step S25.

[Step S25] The control unit 11-1 activates failover processing of the LUNs that belong to the FO group of the monitoring processing target. Then, the control unit 11-1 inverts the mirroring direction of the LUNs and changes the secondary site to the master.

[Step S26] The control unit 11-1 registers an asynchronous sense notifying that the access state of the LUNs has been changed.

[Step S27] The control unit 11-1 clears the relevant frequency of I/O in the I/O frequency table T3.

[Step S28] The control unit 11-1 discriminates whether or not processing of all FO groups has been completed. If the processing has been completed, the processing proceeds to a step S29. If the processing has not been completed. the processing returns to the step S23.

[Step S29] The control unit 11-1 sets the regular monitoring processing to a sleep state until an opportunity for activation of the next monitoring processing.

Figure 20:
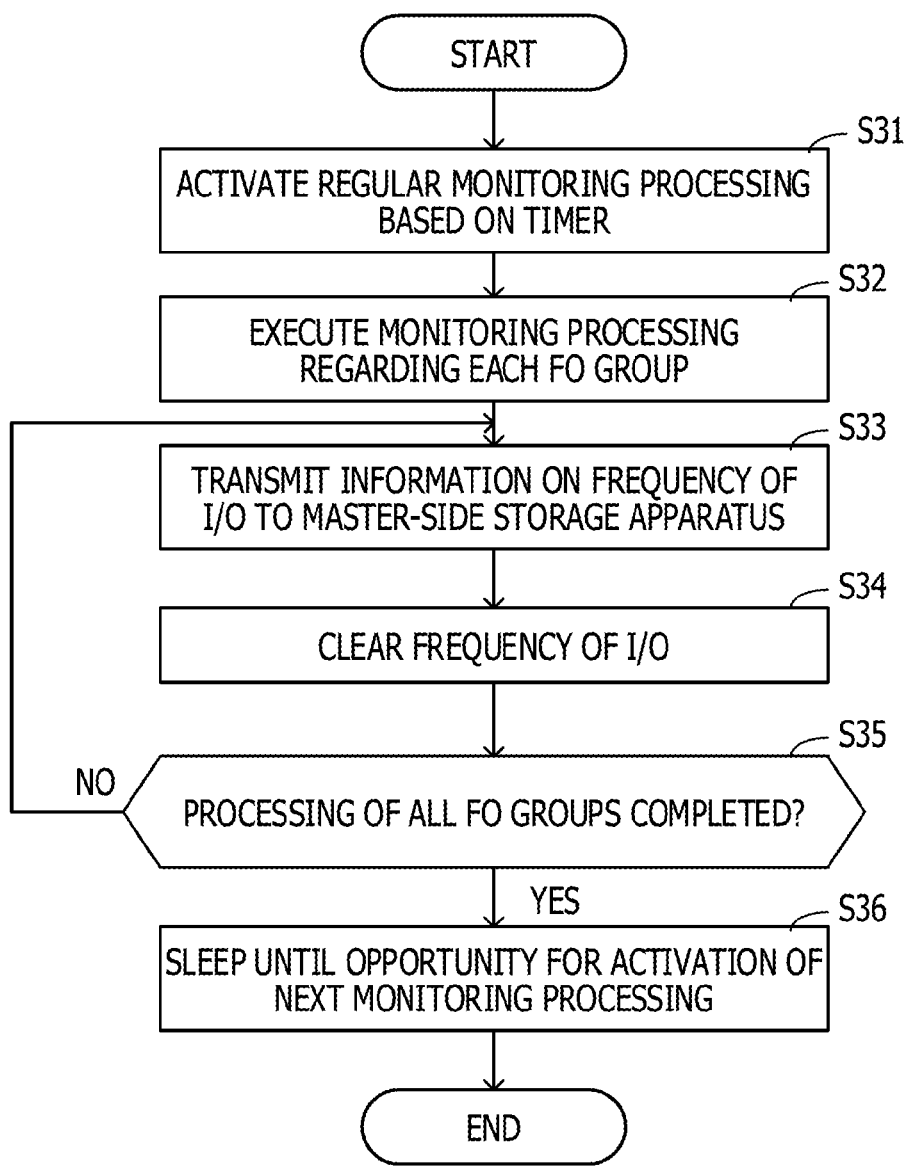
FIG. 20 is a flowchart illustrating operation of a regular monitoring processing (slave side)

FIG. 20 is a flowchart illustrating operation of the regular monitoring processing. The following flow of FIG. 20 represents the operation of the CM in the storage apparatus on the slave side.

[Step S31] The control unit 11-1 activates the regular monitoring processing based on a timer.

[Step S32] The control unit 11-1 carries out monitoring processing regarding each FO group.

[Step S33] The control unit 11-1 transmits information on the frequency of I/O to the master-side storage apparatus.

[Step S34] The control unit 11-1 clears the relevant frequency of I/O in the I/O frequency table T3.

[Step S35] The control unit 11-1 discriminates whether or not processing of all FO groups has been completed. If the processing has been completed, the processing proceeds to a step S36. If the processing has not been completed. the processing returns to the step S33.

[Step S36] The control unit 11-1 sets the regular monitoring processing to a sleep state until an opportunity for activation of the next monitoring processing.

<Communication Sequence>

Figure 21:
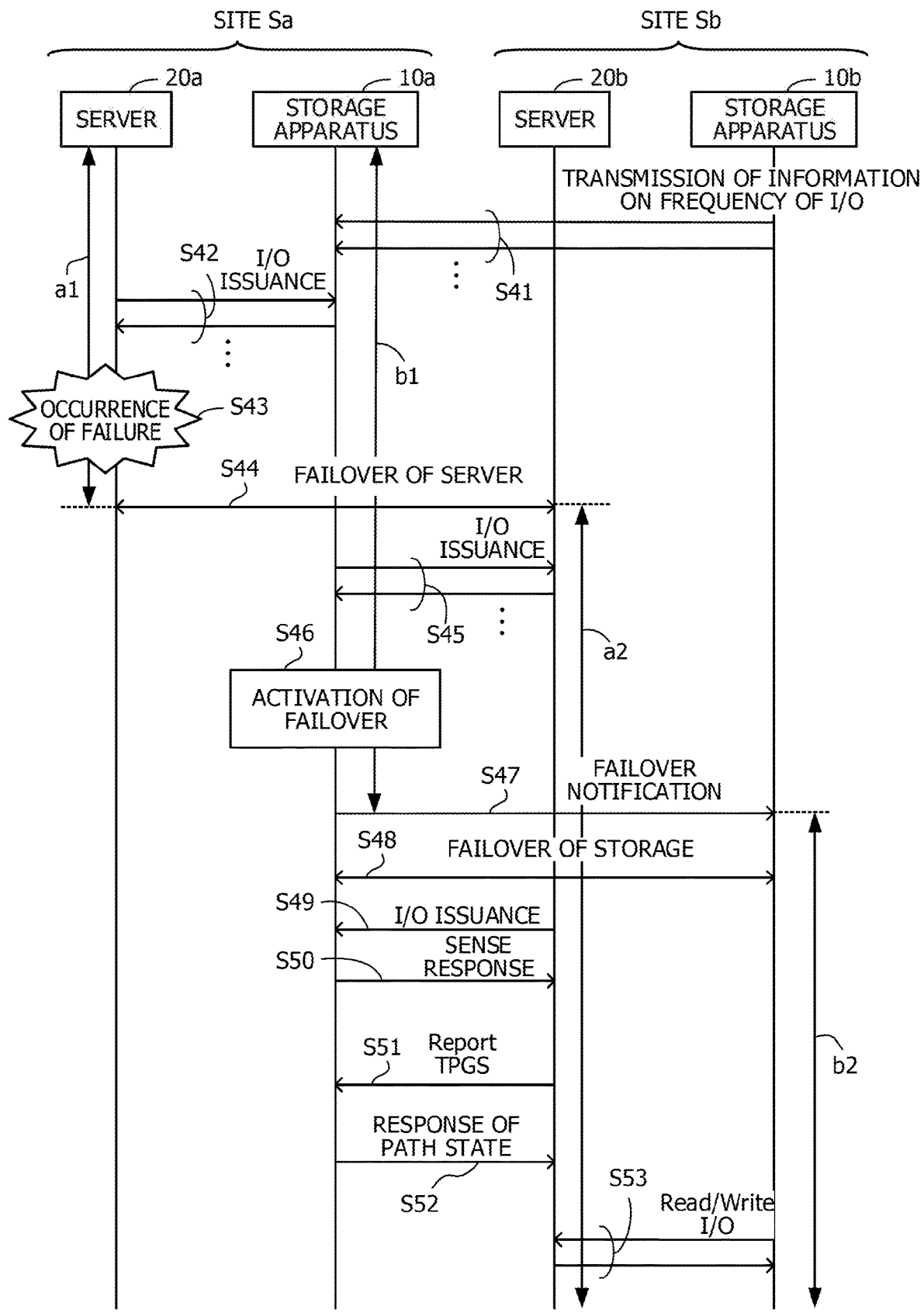
FIG. 21 is a diagram illustrating one example of a communication sequence among pieces of apparatus in a storage system.

FIG. 21 is a diagram illustrating one example of a communication sequence among pieces of apparatus in the storage system. FIG. 21 represents the communication sequence from the occurrence of failover of a server to execution of failover of storage apparatus and switching of the I/O issuance destination storage.

[Step S41] The storage apparatus 10b periodically transmits information on the frequency of I/O to the storage apparatus 10a.

[Step S42] Communication of I/O issuance is carried out between the server 20a and the storage apparatus 10a.

[Step S43] Failure occurs in the server 20a.

[Step S44] Failover from the server 20a to the server 20b is carried out.

[Step S45] Communication of I/O issuance is carried out between the server 20b and the storage apparatus 10a.

[Step S46] The storage apparatus 10a detects that the access source has changed by the regular monitoring processing and activates failover processing.

[Step S47] The storage apparatus 10a carries out failover notification to the storage apparatus 10b.

[Step S48] The failover processing is carried out between the pieces of storage apparatus 10a and 10b.

[Step S49] The server 20b issues I/O to the storage apparatus 10a.

[Step S50] The storage apparatus 10a makes sense response to the server 20b.

[Step S51] The server 20b transmits the Report TPGS command to the storage apparatus 10a.

[Step S52] The storage apparatus 10a makes response notifying that the path on the side of the storage apparatus 10b is Active/Optimized to the server 20b.

[Step S53] Data reading/writing is carried out between the server 20b and the storage apparatus 10b.

In FIG. 21, in a section a1, the server 20a is the master and the server 20b is the slave. In a section a2, the server 20b is the master and the server 20a is the slave. Furthermore, in a section b1, the storage apparatus 10a is the master and the storage apparatus 10b is the slave. In a section b2, the storage apparatus 10b is the master and the storage apparatus 10a is the slave.

As described above, according to the present disclosure, in a cluster configuration of servers/storages between remote sites, if one server is switched to the active state due to server-down of the other server or load balancing, storage apparatus detects failover of the other server based on increase in access from the opposite site. Then, the storage apparatus notifies the one server of that the path state has changed. This makes it possible to continue access to the path with the lowest communication overhead for the storage in conjunction with the failover of the server.

Processing functions of pieces of storage apparatus 1, 10a, and 10b of the present disclosure described above can be implemented by a computer. In this case, a program which includes a plurality of instructions for processing of functions which the pieces of storage apparatus 1, 10a, and 10b are desired to have is provided. By executing the program by a computer, the above-described processing functions are implemented on the computer.

The program which includes a plurality of instructions for processing can be recorded on a computer-readable recording medium. As the computer-readable recording medium, there are a magnetic storing apparatus, optical disc, magneto-optical recording medium, semiconductor memory, and so forth. As the magnetic storing apparatus, there are hard disk apparatus (HDD), flexible disc (FD), magnetic tape, and so forth. As the optical disc, there are CD-ROM/RW and so forth. As the magneto-optical recording medium, there are Magneto Optical disk (MO) and so forth.

In the case of distributing the program, for example, portable recording media such as CD-ROMs on which the program is recorded are sold. Furthermore, it is also possible to store the program in the storing apparatus of a server computer and transfer the program from the server computer to other computers through a network.

The computer that executes the program stores the program recorded on a portable recording medium or the program transferred from a server computer in its own storing apparatus, for example. Then, the computer reads the program from its own storing apparatus and executes processing in accordance with the program. It is also possible for the computer to read the program directly from the portable recording medium and execute the processing in accordance with the program.

Furthermore, it is also possible for the computer to execute processing in accordance with a received program sequentially every time the program is transferred from a server computer coupled through a network. Moreover, it is also possible to implement at least part of the above-described processing functions by an electronic circuit such as DSP, ASIC, or PLD.

Although the embodiments are exemplified above, the configuration of each unit represented in the embodiments can be replaced by another configuration including the same functions. Furthermore, another arbitrary constituent or step may be added. Moreover, what is obtained by combining arbitrary two or more configurations (characteristics) in the above-described embodiments may be employed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage system comprising:
a first memory; and
a processor coupled to the first memory and the processor configured to
calculate a first number of accesses through a first network using a first communication protocol from a first server to the first memory and a second number of accesses through a second network using a second communication protocol from a second server to the first memory, the first communication protocol being different from the second communication protocol,
detect switching from the first server to the second server in accordance with the first number and the second number,
determine whether a first site in which the first memory is disposed and a second site in which the second server is disposed are different on the basis of location information that represents a location relationship between the first memory and the second server, and
perform a change of an access destination of the second server to a second memory disposed in the second site when the first site and the second site are different.

2. The storage system according to claim 1, wherein the switching is detected when the second number is larger than the first number.

3. The storage system according to claim 1, wherein
the first memory includes a first group obtained by grouping storage areas, the first group being an access destination of the first server and the second server,
the second memory includes a second group obtained by grouping storage areas, and
the change includes changing the access destination of the second server from the first group to the second group.

4. The storage system according to claim 1, wherein the processor is configured to execute mirroring processing from the first memory to the second memory before the change is performed.

5. The storage system according to claim 1, wherein mirroring processing from the second memory to the first memory is executed after the change is performed.

6. A computer-implemented storage method comprising:
calculating a first number of accesses through a first network using a first communication protocol from a first server to the first memory and a second number of accesses through a second network used a second communication protocol from a second server to the first memory, the first communication protocol being different from the second communication protocol;
detecting switching from the first server to the second server in accordance with the first number and the second number;
determining whether a first site in which the first memory is disposed and a second site in which the second server is disposed are different on the basis of location information that represents a location relationship between the first memory and the second server; and
changing an access destination of the second server to a second memory disposed in the second site when the first site and the second site are different.

7. The storage method according to claim 6, wherein the switching is detected when the second number is larger than the first number.

8. The storage method according to claim 6, wherein
the first memory includes a first group obtained by grouping storage areas, the first group being an access destination of the first server and the second server,
the second memory includes a second group obtained by grouping storage areas, and
the change includes changing the access destination of the second server from the first group to the second group.

9. The storage method according to claim 6, wherein mirroring processing from the first memory to the second memory is executed before the changing is performed.

10. The storage system according to claim 7, wherein mirroring processing from the second memory to the first memory is executed after the changing is performed.

11. A non-transitory computer-readable medium storing instructions executable by one or more computer, the instructions comprising:
one or more instructions for calculating a first number of accesses through a first network using a first communication protocol from a first server to the first memory and a second number of accesses through a second network using a second communication protocol from a second server to the first memory, the first communication protocol being different from the second communication protocol;
one or more instructions for detecting switching from the first server to the second server in accordance with the first number and the second number;
one or more instructions for determining whether a first site in which the first memory is disposed and a second site in which the second server is disposed are different on the basis of location information that represents a location relationship between the first memory and the second server; and
one or more instructions for changing an access destination of the second server to a second memory disposed in the second site when the first site and the second site are different.

* * * * *